United States Patent [19]
Hirabayashi et al.

[11] Patent Number: 5,625,391
[45] Date of Patent: Apr. 29, 1997

[54] INK JET RECORDING METHOD AND APPARATUS

[75] Inventors: Hiromitsu Hirabayashi, Yokohama; Shigeyasu Nagoshi; Hitoshi Sugimoto, both of Kawasaki; Miyuki Matsubara, Tokyo; Kiichiro Takahashi, Yokohama, all of Japan

[73] Assignee: Canon Kabushiki Kaisha, Tokyo, Japan

[21] Appl. No.: 573,755

[22] Filed: Dec. 18, 1995

Related U.S. Application Data

[63] Continuation of Ser. No. 407,244, Mar. 20, 1995, abandoned, which is a continuation of Ser. No. 990,796, Dec. 10, 1992, abandoned.

[30] Foreign Application Priority Data

Dec. 13, 1991 [JP] Japan .................. 3-330677

[51] Int. Cl.⁶ .................................................. B41J 2/21
[52] U.S. Cl. ........................................ 347/41; 347/43
[58] Field of Search ............................ 347/40, 41, 43

[56] References Cited

U.S. PATENT DOCUMENTS

| | | | |
|---|---|---|---|
| 4,313,124 | 1/1982 | Hara .................. | 346/140 R |
| 4,345,262 | 8/1982 | Shirato et al. ............. | 346/140 R |
| 4,459,600 | 7/1984 | Sato et al. ............... | 346/140 R |
| 4,463,359 | 7/1984 | Ayata et al. .............. | 346/1.1 |
| 4,558,333 | 12/1985 | Sugitani et al. ............ | 346/140 R |
| 4,723,129 | 2/1988 | Endo et al. .............. | 346/1.1 |
| 4,740,796 | 4/1988 | Endo et al. .............. | 346/1.1 |
| 4,967,203 | 10/1990 | Doan et al. ............... | 346/1.1 |
| 5,142,374 | 8/1992 | Tajika et al. ............. | 358/298 |

FOREIGN PATENT DOCUMENTS

| | | |
|---|---|---|
| 0292292 | 11/1988 | European Pat. Off. . |
| 54-56847 | 5/1979 | Japan . |
| 58-194541 | 11/1983 | Japan . |
| 59-123670 | 7/1984 | Japan . |
| 59-138461 | 8/1984 | Japan . |
| 60-71260 | 4/1985 | Japan . |
| 60-107975 | 6/1985 | Japan . |

OTHER PUBLICATIONS

Bayer, B.E., "An Optimum Method for Two–Level Rendition of Continuous–Tone Pictures", IEEE Intl. Conf. On Comm., 1973, pp. 26–11 to 26–15.
Eur. Pat. Off. Search Report for Eur. Pat. Appln. No. 92311337.7.

*Primary Examiner*—N. Le
*Attorney, Agent, or Firm*—Fitzpatrick, Cella, Harper & Scinto

[57] ABSTRACT

A recording section of each of recording heads of different recording colors is divided into a plurality of sub-sections, and the recording heads are moved back and forth relative to a recording medium to conduct a main scan in each run, and thinned images are sequentially recorded on the same area of the recording medium by using different recording sections of the recording heads in a plurality of main scans. The numbers of dots recorded in the main scans are equal without regard to the image data to prevent ununiformity of density due to reach accuracy and amount of discharge and regular ununiformity of color due to a sequence of ink injection.

108 Claims, 30 Drawing Sheets

FIG. 18

| 1 | 53 | 9 | 61 | 19 | 39 | 27 | 47 |
|---|----|---|----|----|----|----|----|
| 37 | 17 | 45 | 25 | 55 | 3 | 63 | 11 |
| 49 | 5 | 57 | 13 | 35 | 23 | 43 | 31 |
| 21 | 33 | 29 | 41 | 7 | 51 | 15 | 59 |
| 28 | 48 | 20 | 40 | 10 | 62 | 2 | 54 |
| 64 | 12 | 56 | 4 | 46 | 26 | 38 | 18 |
| 44 | 32 | 36 | 24 | 58 | 14 | 50 | 6 |
| 16 | 60 | 8 | 52 | 30 | 42 | 22 | 34 |

↑ PAPER FEED DIRECTION

[S] (2n-1)TH SCAN HEAD SCAN DIRECTION →

[S] (2n)TH SCAN HEAD SCAN DIRECTION ←

AREA GRADATION PATTERN 1
AND THINNING PATTERN 1

FIG. 19

| 1 | 53 | 9 | 61 | 19 | 39 | 27 | 47 |
|---|----|---|----|----|----|----|----|
| 37 | 17 | 45 | 25 | 55 | 3 | 63 | 11 |
| 49 | 5 | 57 | 13 | 35 | 23 | 43 | 31 |
| 21 | 33 | 29 | 41 | 7 | 51 | 15 | 59 |
| 28 | 48 | 20 | 40 | 10 | 62 | 2 | 54 |
| 64 | 12 | 56 | 4 | 46 | 26 | 38 | 18 |
| 44 | 32 | 36 | 24 | 58 | 14 | 50 | 6 |
| 16 | 60 | 8 | 52 | 30 | 42 | 22 | 34 |

↑ PAPER FEED DIRECTION

[S] (2n-1)TH SCAN HEAD SCAN DIRECTION →

[S] (2n)TH SCAN HEAD SCAN DIRECTION ←

AREA GRADATION PATTERN 1
AND THINNING PATTERN 2

FIG. 20
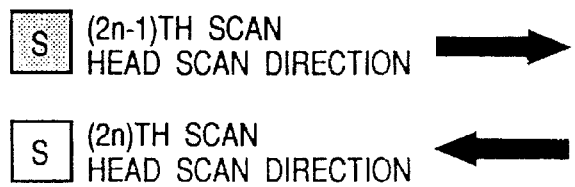
AREA GRADATION PATTERN 2
AND THINNING PATTERN 1
FIG. 21
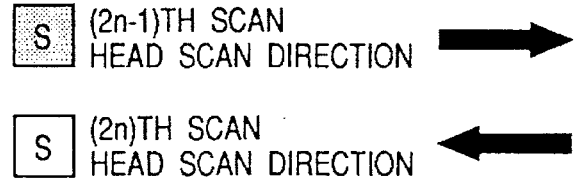
AREA GRADATION PATTERN 2
AND THINNING PATTERN 2

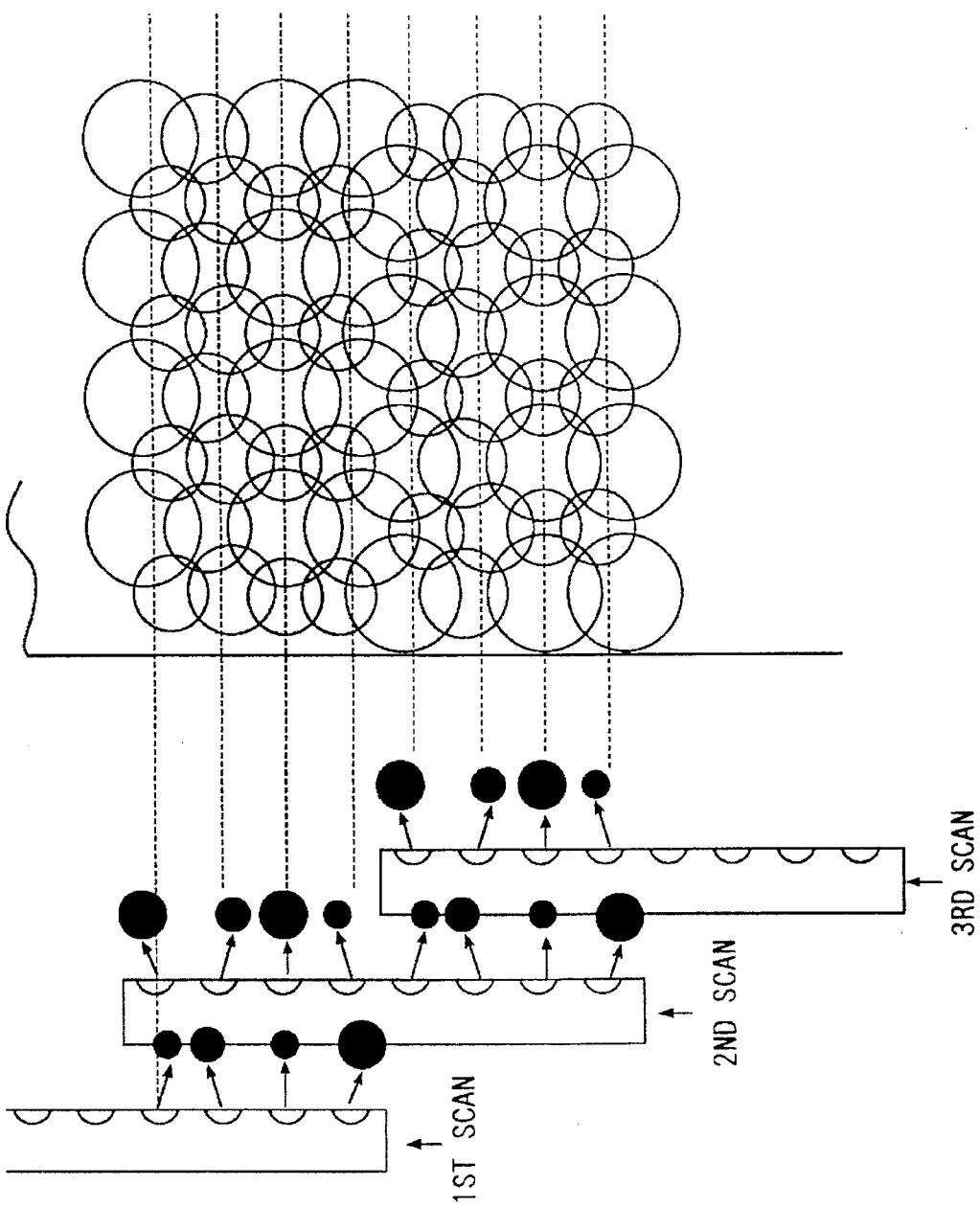

CHECKER

REVERSE CHECKER

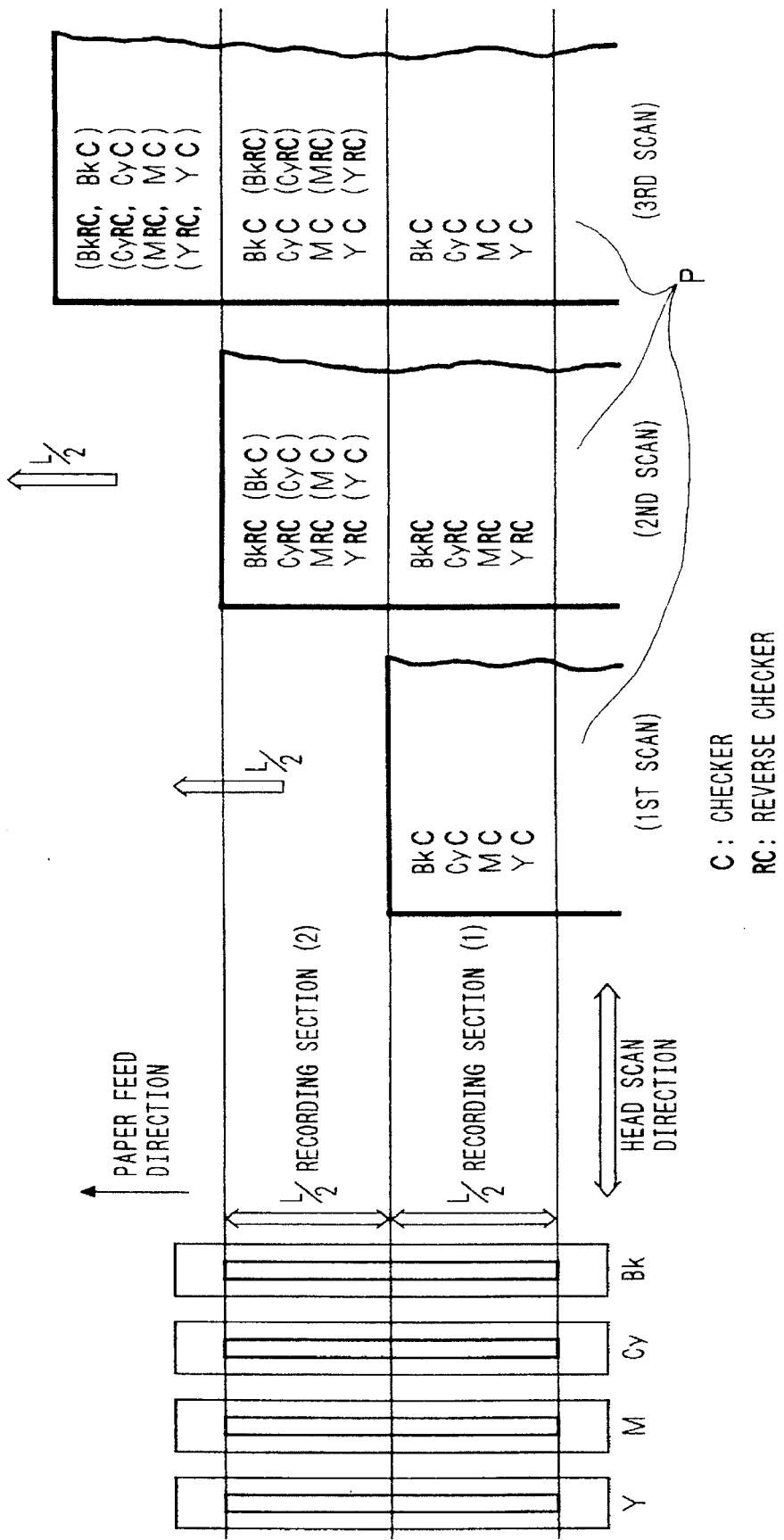

INK JET RECORDING METHOD AND APPARATUS

This application is a continuation of application Ser. No. 08/407,244, filed Mar. 20, 1995, now abandoned, which was a continuation of application Ser. No. 07/990,796, filed Dec. 10, 1992, now abandoned.

BACKGROUND OF THE INVENTION

1. Field of the Invention

The present invention relates to an ink jet recording apparatus including record means having a plurality of discharge ports (or discharge orifices) arranged therein for discharging ink to a recording medium to record information.

2. Related Background Art

Office automation equipments such as computers, word processors and copiers have recently been widely used and a number of recording methods of recording apparatus therefor have been developed. An ink jet recording apparatus is characterized in that it is easier to attain fine recording with such an apparatus than other recording method, higher speed and more silent, and is less expensive. A need for the ability to print in color is also increasing and many color ink jet recording apparatus have been developed. The ink jet recording apparatus discharges ink from a nozzle to deposit the ink to a record sheet to form an image. In order to enhance a recording speed, a recording head (multi-head) having a plurality of recording elements integrated therein is used so that a plurality of ink discharge ports and ink paths are integrated. For color printing, a plurality of such multi-heads are arranged.

However, unlike a monochromatic printer for printing only characters, various factors such as hue (coloring or color development), tonality and uniformity must be considered in printing a color image.

As to the uniformity, even a slight variation among nozzle units due to a difference among multi-head manufacturing processes affects to an amount of ink discharged from the nozzle and a direction of discharge in printing and it finally appears as ununiformity of density in the printed image, which causes a degradation in image quality.

A specific example is explained with reference to FIGS. 25 and 26. In FIG. 25A, numeral 91 denotes a multi-head which is assumed to comprise light multi-nozzles 92. Numeral 93 denotes an ink droplet discharged from the multi-nozzle 92. Ideally, the ink is discharged with a uniform amount of discharge in a uniform direction as shown in FIG. 25A. If such discharge is attained, dots of uniform size reach a record sheet as shown in FIG. 25B so that a uniform image free of ununiformity in density is formed overall (FIG. 25C). However, in reality, there is a variation among nozzles as described above, and if the printing is done in the manner described above, there occurs variations in the size and direction of the ink droplets discharged from the nozzles, and the droplets reach the record sheet in a manner shown in FIG. 26B.

As seen from FIG. 26B, a white area which does not meet an area factor of 100% appears periodically relative to a head main scan direction, or dots overlap more than required, or a white band appears as shown at the center of the drawing. An aggregation of the dots deposited on the record sheet has a distribution of density in the direction of nozzle arrangement as shown in FIG. 26C, and it appears as ununiformity of density when it is observed by human eyes.

The following method has been proposed as a countermeasure for the ununiformity of density. It is explained with reference to FIGS. 27 and 28. In this method, the multi-head 91 is scanned three times to complete the print area shown in FIGS. 25 and 26 but half of the print area (four-pixel unit area) is completed in two passes. The eight nozzles of the multi-head are divided into an upper four-nozzle group and a lower four-nozzle group, and the number of dots to be printed by one nozzle in one scan is reduced to approximately one half of the dots of the given image data in accordance with a predetermined image data arrangement. In the second scan, dots are printed in accordance with the remaining half of the image data to complete the printing of the four-pixel unit area. The above recording method is hereinafter referred to as a divisional recording method.

In accordance with this recording method, the affect of the nozzle inherency to the printed image is reduced to one half even if the same multi-head as that shown in FIG. 26 is used, and the printed image appears as shown in FIG. 27B in which the black stripes and the white stripes shown in FIG. 26B are not very prominent. As a result, the ununiformity of density is also significantly reduced compared to that of FIG. 26, as shown in FIG. 27C.

In such recording method, the image data is divided for the first scan and the second scan in accordance with a predetermined arrangement so that they complement each other. The image data arrangement (thinned pattern) is usually a checker pattern (or zigzag pattern) for each vertical and horizontal pixel as shown in FIG. 28. Accordingly, the printing in the unit print area (four-pixel unit in the present example) is completed by the first scan in which the checker pattern is printed and the second scan-in which the reverse checker pattern (or complementary zigzag pattern) is printed. FIGS. 28A, 28B and 28C show how the recording of a given area is completed by the checker pattern and the reverse checker pattern, when the eight-nozzle multi-head is used as it is in FIGS. 25 to 27. In the first scan, the checker pattern is recorded by using the lower four nozzles (FIG. 28A). In the second scan, the sheet is fed by four pixels (½ of the head length) and the reverse checker pattern is recorded (FIG. 28B). In the third scan, the sheet is further fed by four pixels (½ of the head length) and the checker pattern is recorded again (FIG. 28C).

In this manner, the sheet feed of the four-pixel length and the recording of the checker pattern and the reverse checker pattern are sequentially and alternately conducted so that the printing of the four-pixel unit record area is completed for each scan. As described above, since the printing in one area is completed by two different groups of nozzles, a high quality image which is free from the ununiformity of density is attained.

This printing method is disclosed in U.S. Pat. No. 4,967,203 and Japanese Laid-Open Patent Application No. 60-107975 and it is effective to solve the problems of the ununiformity of density and the connecting lines.

Although the above method can reduce the ununiformity of density due to variation in dot deposition (for example, landing deviation) and the amount of discharge, it still has a problem in that regular ununiformity of color appears when a half-tone color is printed in an entire area, due to the fact that inks of different colors are overlapped and put adjacently.

FIG. 29 shows a printing method (hereinafter referred to as an L/n sheet feed printing method, where n is the number of divisions) by the prior art head division.

In this method, the recording section (L) of the recording head is divided into two sections, and each recording head records the checked pattern or the reverse checker pattern in the first scan, and after the sheet feed by the L/2 width, it records the remaining reverse (or complementary) checker pattern or checker pattern by the different nozzles in the second scan to complete the printing. The discharge port line is not visible in the drawing but it is shown as a vertical perspective view for convenience sake.

More specifically, in the first scan, the thinned half printing of the checker pattern is conducted by the nozzles in the recording section (1) of the printing heads. Then, the sheet is fed by L/2 width. In the second scan, the thinned half printing of the reverse checker pattern is conducted by the recording heads in each of the recording sections (1) and (2). At this point, the printing by the recording section (2) is completed. The sheet is further fed by L/2 width. In the third scan, the thinner printing of the checker pattern is made for the entire area of the record area. The same steps are repeated. In FIG. 29, the indicia in the parenthes in the second and third scan indicate the previously printed ones.

A reason why the ununiformity of half-tone color takes place in the prior art method is explained below for an eight-nozzle multi-nozzle head. In this example, an image to be recorded is blanket print (or solid print) of a half tone color (yellowish green) having Cy 62.5% and Y 100% in print duty factor superimposed. The half-tone color is divided into two parts by using a checker pattern mask and a reverse checker pattern mask, and they are overprinted in two scans.

FIG. 30 shows discharge positions of a Cy recording head and a Y recording head in the first scan in the L/2 sheet feed printing method and the resulting dot formation on a recording medium. A thick hatching mark shows that Cy and Y are recorded on the same pixel. Cy dots recorded by the recording section (1) reach the sheet without any adjacent dots. In the first scan, the recording head uses four nozzles of the recording section (1) to discharge the ink in the checker pattern so that the Cy-Y overlapped dots are formed in the checker pattern on the recording medium. Then, the L/2 width sheet feed is effected and the image area on the sheet recorded in the first scan is moved toward the recording section (2).

FIG. 31 shows the discharge positions in the second scan and the resultant dot formation on the recording medium. A dark mesh pattern in the recording section (2) shows that Cy and Y are recorded on the same pixel between the adjacent pixels in which Cy and Y or Y were printed in the first scan in the recording section (1), and a light hatching pattern shows a pixel in which only Y is printed. A dark hatching pattern in the recording section (1) is same as that in the first scan, and a light hatching pattern shows a pixel in which only Y is printed. At this time, the printing head prints the reverse checker pattern in the entire area of the recording sections (1) and (2). As a result, dots are overprinted in the recording section (2) to interpolate image data to the checker pattern dots recorded in the first scan in the first image area.

Then, the L/2 sheet feed is effected so that the first image area is moved out of the recording section and the second image area having the reverse checker pattern printed in the recording section (1) is moved toward the recording section (2) and the third image area comes into the recording section (1).

The hue (coloring or color development) which is important in the color printing is now explained. When a dot is overlapped on a previously recorded dot, there is a trend that the later printed dot sinks more deeply in the depthwise direction of the sheet than the early printed dot and it spreads around the early printed dot. The same is true when a dot reaches on an adjacent dot. FIG. 33 shows a sectional view for illustrating the spread of the ink when a new dot is printed on a previously deposited dot. Pigments such as dyes in the discharged ink physically and chemically couple with the recording medium but since the coupling of the recording medium and the pigments is definite, the coupling of the early discharged ink pigments and the recording medium is preferential unless there is a big difference in the coupling force depending on the type of pigment so that the early discharged ink pigments remain on the surface of the recording medium more than the later printed ink pigments, which are hard to couple on the surface of the recording medium and sink in the depthwise direction of the sheet.

In FIG. 31, the Cy-Y mixed pixel which is heavily related to the density is shown by a dark hatching pattern as recorded in the first scan, and by a dark mesh pattern as recorded in the second scan.

FIG. 32 shows discharge positions in the third scan and the resulting dot formation on the record medium.

At this time, the checker pattern which is complementary to that in the second scan is printed in the entire area of the recording sections (1) and (2). As a result, dots deposited in the recording section (1) adjacently to the reverse checker dots recorded in the second scan to complete the printing.

Similarly, other image areas are sequentially printed by the two-pass scan by the recording head in the recording sections (1) and (2).

However, between the second image area in which the printing is completed in the third scan and the first image area in which the printing is completed in the second scan, the hues may be different in spite of the fact that the same amount of ink is ejected, and the ununiformity of color may result.

This is because a difference in the shapes of the dots having connection with the hue of the new dots which are ejected onto the image area having adjacent dots previously recorded thereon and the dots ejected onto the image area having nothing recorded thereon appears as a difference of hue between the image areas since the numbers of dots injected to the respective image areas in each scan are different. In the present example, since the numbers of Cy dots ejected to the respective image areas in the respective recording scans are different, the numbers of Cy dots which are ejected to the areas having the Cy or Y dots formed adjacently thereto to form indefinite shape dots are different between the two image areas, and hence a difference in hue appears. In the present example, the numbers of the Cy-Y mixed pixels in the respective image areas differ significantly between the first image area (hatching: 16, mesh: 4) and the second image area (hatching: 4, mesh: 16).

As explained above, in the prior art L/n sheet feed printing method, when the printing is made by a plurality of recording scans in the same image area, the improper ununiformity of color takes place in the mixed color recorded area because of the difference in the number of dots ejected in each recording scan, and this causes the degradation in the color recorded image.

Further, in the prior art L/n sheet feed printing method, substantially double number of recording scans is needed to solve the problem of the ununiformity of density due to the variation in the nozzles, and this causes the reduction of the recording speed. Thus, reciprocal scan recording may be considered to improve the recording speed but there exists a problem of difference in hue due to a difference in the sequence of ejection of the ink between the forth run and the back run, which is a problem inherent to the color ink jet recording. The reciprocal scan recording has been put into practical use in a monochromatic ink jet recording apparatus, but in the color recording, the difference in the hue between the image areas appears because the sequence of ejection the inks in the color mixed areas is different between the forth scan and the back scan. Accordingly, there is few case of the color printing which has been put into the practical use. This is due to the fact that the later ejected ink spreads around and depthwise of the early ejected dot as described above. Japanese Laid-Open Patent Application 58-194541 discloses a recording method for relieving the difference in hue in the reciprocal recording. In this method, a smaller number of dots than a total number of dots to be recorded in at least one of each row and each column of a recording dot matrix are intermittently recorded for each color in a forth pass of the reciprocal recording scan, and the remaining dots for each color are intermittently recorded in the back pass so that the dots having different sequences of ink overlap are mixed together.

This method is effective to a blanket print image in which dots of respective colors are finely recorded in a given area, but in the half-tone image data which requires the area gradation recording, the image to be recorded is inherently thinned by a predetermined gradation pattern because of the gradation representation of the image to be recorded. As a result, the gradation pattern and the thinned pattern of each reciprocal recording scan may interfere with each other to create the ununiformity of color as described above. Further, the ununiformity of density due to the variance in the nozzles is not resolved in spite of the reciprocal two-run recording scan to the given image area. Accordingly, this method cannot be simply applied and it has not been put in practical use.

SUMMARY OF THE INVENTION

It is an object of the present invention to provide improved ink jet recording method and apparatus.

It is another object of the present invention to provide ink jet recording method and apparatus which prevent the ununiformity of density, the ununiformity of color and the occurrence of a connecting line and enable to record a high quality color image.

It is still another object of the present invention to provide ink jet recording method and apparatus which prevent the occurrence of the ununiformity of color in a color mixed record area in the reciprocal scan divisional recording and enable to record a high quality color image.

It is still another object of the present invention to provide ink jet recording method and apparatus which prevent the occurrence of the regular ununiformity of color due to a difference in sequence of ink ejection in the reciprocal recording.

It is still another object of the present invention to provide ink jet recording method and apparatus which sequentially recorded thinned images in the same area of a recording medium by using different blocks of recording means through a plurality of main scans in forward and back runs of the recording means, and enable substantially uniform number of dots to be recorded in each main scan.

The above and other objects of the present invention will be apparent from the following description taken in connection with the accompanying drawings.

BRIEF DESCRIPTION OF THE DRAWINGS

FIG. 18 shows an area gradation pattern 1 and a thinned pattern 1 in a third embodiment, FIG. 19 shows the area gradation pattern 1 and a thinned pattern 2 in the third embodiment, FIG. 20 shows an area gradation pattern 2 and the thinned pattern 1 in the third embodiment, FIG. 21 shows the area gradation pattern 2 and the thinned pattern 2 in the third embodiment.

DETAILED DESCRIPTION OF THE PREFERRED EMBODIMENTS

The present invention is now described by citing the preferred embodiments. Those embodiments are intended to explain the present invention in further detail and not intended to limit the present invention to those embodiments.

Figure 23A:
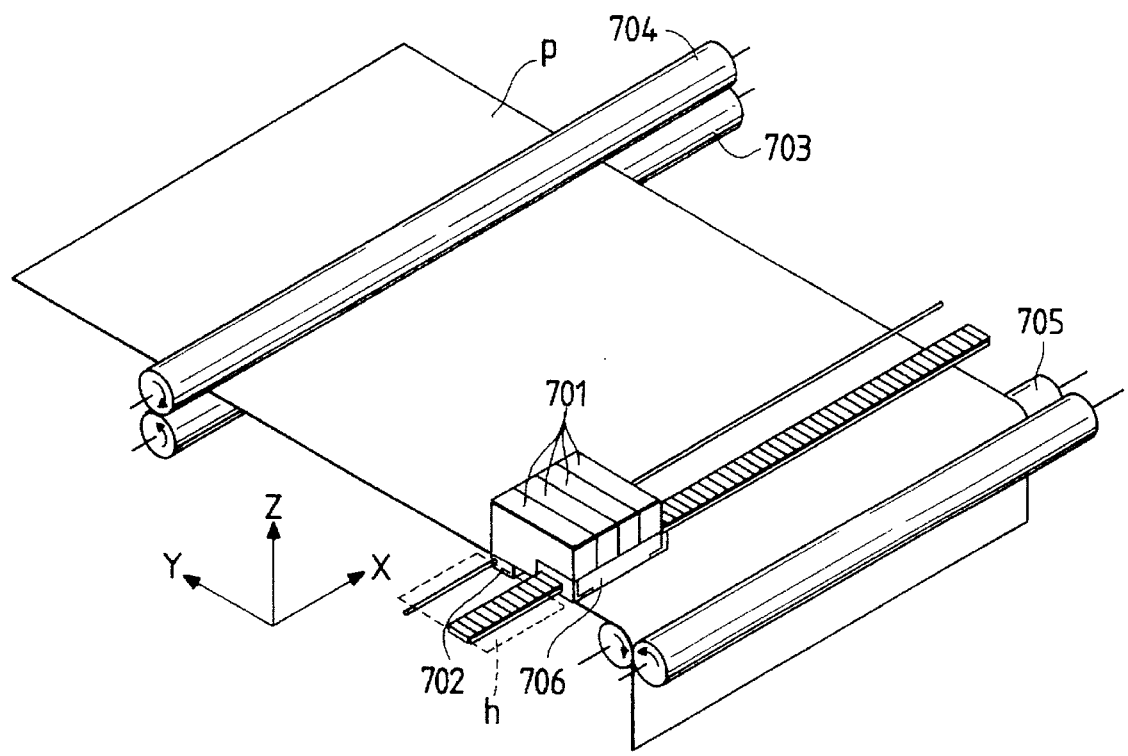
FIGS. 23A and 23B show an ink jet recording apparatus of the present invention.
Figure 23B:
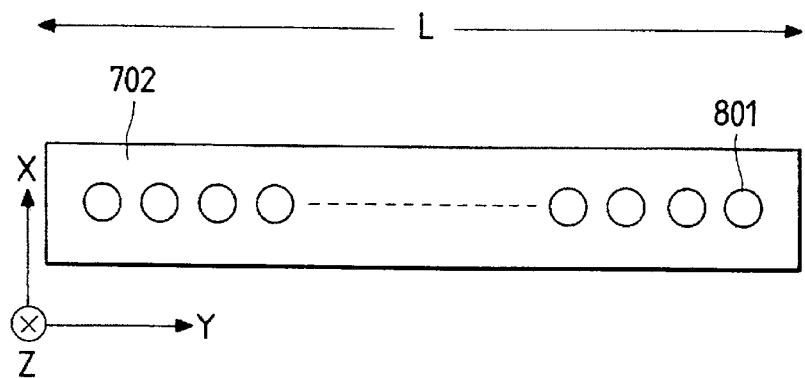

FIG. 23A shows a perspective view of a configuration of an ink jet recording apparatus to which the present invention is applied. In the drawing, numeral 701 denotes an ink cartridge which comprises an ink tank filled with one of four color inks, black (BK), cyan (Cy), magenta (M) and yellow (Y), and a multi-head 702 for those colors. Multi-nozzles arranged on the multi-heads as viewed along a Z-axis is shown in FIG. 23B, in which numeral 801 denotes the multi-nozzles arranged on the multi-head 702. Turning back to FIG. 23A, numeral 703 denotes a sheet feed roller which is rotated in a direction of an arrow while it pinches a print sheet P together with an auxiliary roller 704 to feed the print sheet P in a Y-direction. Numeral 705 denotes a sheet supply roller which supplies the print sheet and also functions to press the print sheet P as the rollers 703 and 704 do. Numeral 706 denotes a carriage which supports the four ink cartridges and drives them as the printing proceeds. It is retracted to a home position h shown by broken lines when the printing is not effected or during a recovery opeartion of the multi-head. In the present embodiment, a recording head of each of the ink jet cartridges discharges ink droplets when a state change in the ink is caused by thermal energy.

The four ink jet cartridges mounted on the carriages 706 are arranged such that inks are over-printed in a sequence of black ink, cyan ink, magenta ink and yellow ink. A half-tone color is attained by appropriately overprinting Cy, M and Y color ink dots. Namely, red is attained by overprinting M and Y, blue by Cy and M, and green by Cy and Y.

Usually, black is attained by overprinting three colors, Cy, M and Y, but if the hue (or coloring) for black is bad, precise overprinting is hard to attain and colored edges appear and an ink ejection density per unit time is too high. Accordingly, black is separately ejected.

Figure 24:
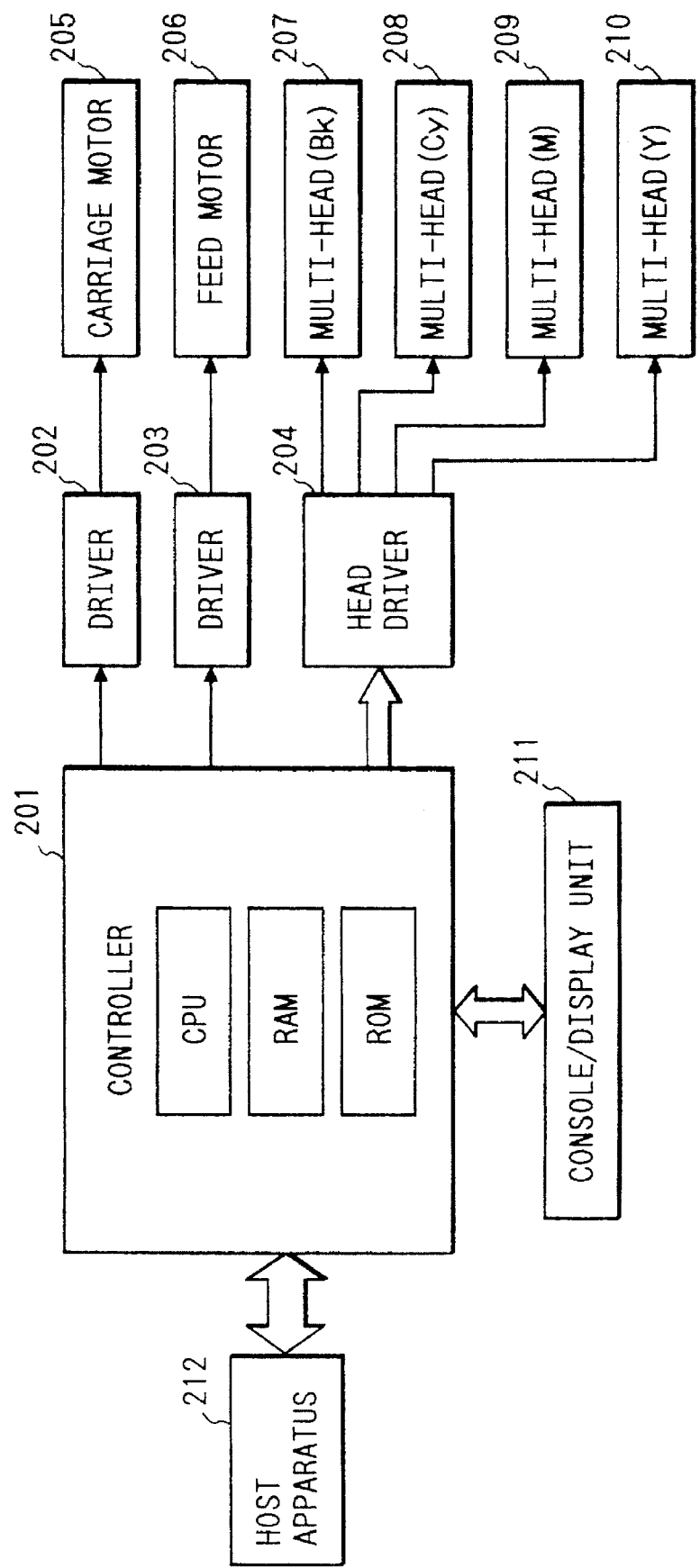
FIG. 24 shows a block diagram of a control unit of the ink jet recording apparatus.

FIG. 24 shows a block diagram of a control unit of the ink jet recording apparatus shown in FIG. 23A. Numeral 201 denotes the control unit which comprises a CPU, a ROM and a RAM and controls the units of the apparatus in accordance with a program stored in the ROM. Numeral 202 denotes a driver for driving a carriage motor 205 to drive the carriage 706 in an X-direction (main scan) in accordance with a signal from the control unit 201, numeral 203 denotes a driver for driving a carriage motor 206 to drive the sheet supply motor 705 and the sheet feed roller 703 to feed the recording sheet in a Y-direction (sub-scan) in accordance with a signal from the control unit 201, numeral 204 denotes a driver for driving color multi-heads 207–210 in accordance with print data from the control unit 201, and numeral 211 denotes a host apparatus for supplying the print data to the control unit 201.

When a start of print command is issued, the carriage 706, which was at the position shown in the drawing (home position) prior to the start of printing, is driven (forward run) in the X-direction to print for each divided record area on the sheet by n multi-nozzles 801 on the multi-heads 702. When data is printed up to an end of the sheet, the carriage is reversely driven (backward run) to print in the X-direction. After the end of the first printing and before the start of the second printing, the sheet feed roller 703 is rotated in the direction of arrow to feed the sheet in the Y-direction by a width of the divided record area. In this manner, the printing by the multi-heads and the sheet feed (sub-scan) are repeated for each scan (main scan) by the forward run or the backward run of the carriage to complete the printing of data on one sheet.

Figure 1:
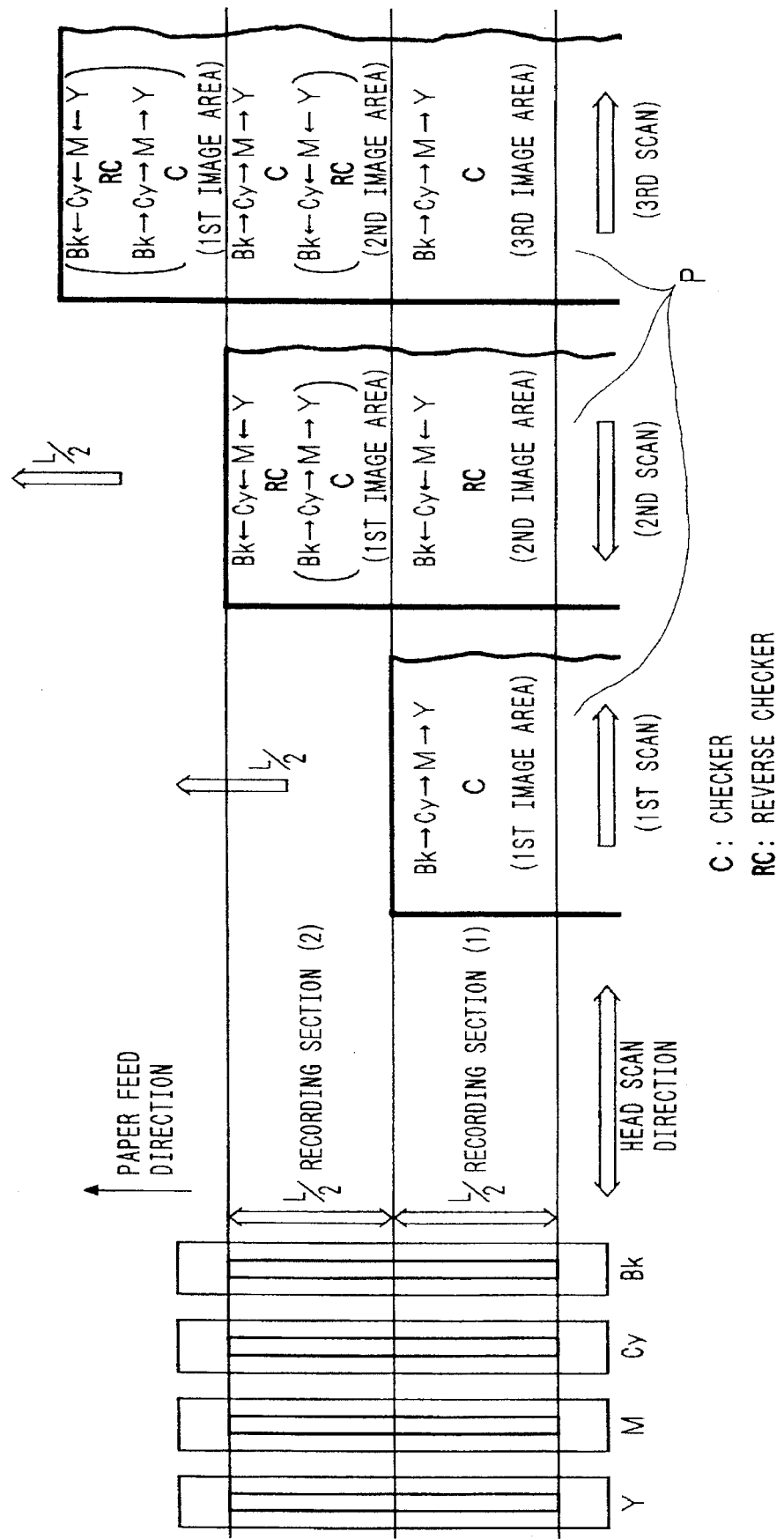
FIG. 1 shows a recording method in a first embodiment of the present invention.

FIG. 1 shows a recording method in the present embodiment. In the present invention, color recording is effected by reciprocal scan by the reciprocal movement of the carriage 706. Odd-numbered scan corresponds to the forward run scan, and even-numbered scan corresponds to the backward run scan. In the forward run scan, the inks are ejected in a sequence of Bk-Cy-M-Y, and in the backward run scan, the inks are ejected in a sequence of Y-M-Cy-Bk. A checker pattern (or zigzag pattern) thinned from original image data is first printed to a first image area by recording sections (1) (low half nozzles) of the recording heads in a first scan (forward run scan). A checker thinned dot image is formed in the first image area-on the recording medium P in the sequence of Bk-Cy-M-Y. Then, the sheet is fed by L/2 width by the rollers 703–705. In a second scan (backward scan), the recording heads thin the image data in a reverse checker pattern (or complementary zigzag pattern) to interpolate the checker pattern of the first scan and print to the first image area by recording sections (2) (upper half nozzles) of the recording heads and a second image area by the recording sections (1) (lower half nozzles) of the recording heads. At this time point, in the first image area, the thinned reverse checker image data is printed in the sequence of Y-M-Cy-Bk to those record pixels which were not printed in the first scan so that the recording of the image data is completed. The dots recorded in the first image area were printed in the checker record pixels in the sequence of Bk-Cy-M-Y, and in the reverse checker record pixels in the sequence of Y-M-Cy-Bk.

The sheet is then further fed by L/2 width by the rollers 703–705, and in a third scan (forth run scan), the image data is thinned to the same checker pattern as that of the first scan, and the second image area is printed by the upper half nozzles and a third image area is printed by the lower·half nozzles. The printing to the second image area is completed in the third scan. The dots recorded in the second image area were printed in the reverse checker record pixels in the sequence of Y-M-Cy-Bk and in the checker record pixels in the sequence of Bk-Cy-M-Y. The above steps are repeated to sequentially record on the image areas on the recording medium P divided by the half width (L/2) of the recording head so that the recording of the entire image data is completed. Indicia in parenthes in the second and third scans in FIG. 1 indicate previously printed ones.

In the present embodiment, in order to unify the number of ejected dots in each recording scan, the ink jet recording head having a double recording density to an image data recording density is used and each pixel of the image data is divided into four recording pixels which are recorded by the same data. By using the recording head having the double recording density, the number of ejected dots for each recording scan in each recording section can be unified for any image data to be recorded even when the interpolation is made by the simple checker and reverse checker thinned patterns.

In the color ink jet recording apparatus of the present invention, a difference of hue does not occur although the image is recorded by the reciprocal scan. This is explained below.

In the present embodiment, the 180 dpi-image data is printed at the 360 dpi recording density. Accordingly, as described above, whatever the pixel arrangement of the image data is, the numbers of ejected dots in the first image area are equal in the first scan (forward run scan) and the second scan (backward run scan). Accordingly, the hue in the first image area is an average of the hue of the dots printed on the checker recording pixels in the sequence of Bk-Cy-M-Y in the forward run scan and the hue of the dots printed on the reverse checker recording pixels in the sequence of Y-M-Cy-Bk in the backward run scan.

Similarly, the hue in the second image area is an average of the hue of the dots printed on the reverse checker recording pixels in the sequence of Y-M-Cy-Bk in the backward run scan and the hue of the dots printed on the checker recording pixels in the sequence of Bk-Cy-M-Y in the forward run scan. Consequently, the hues of the first image area and the second image area are equal although the sequences of the thinned printing are opposite.

Figure 5:
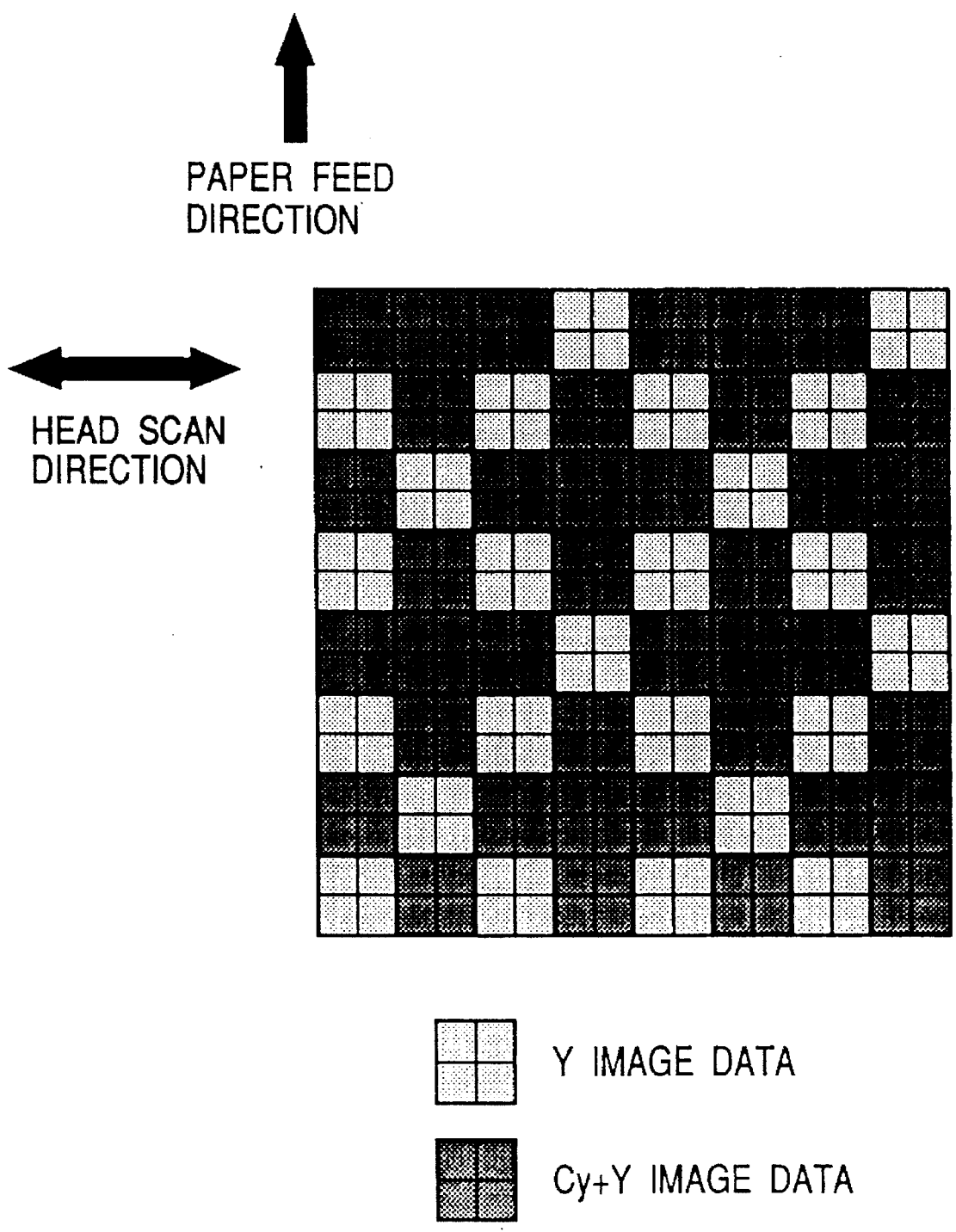
FIG. 5 shows a specific example of image data.
Figure 6:
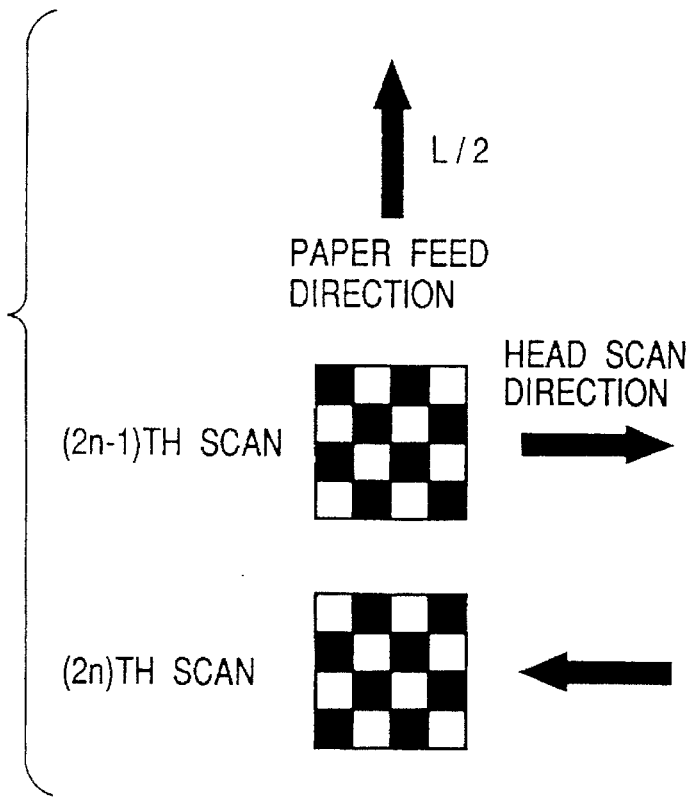
FIG. 6 illustrates a thinning method in the first embodiment.
Figure 7:
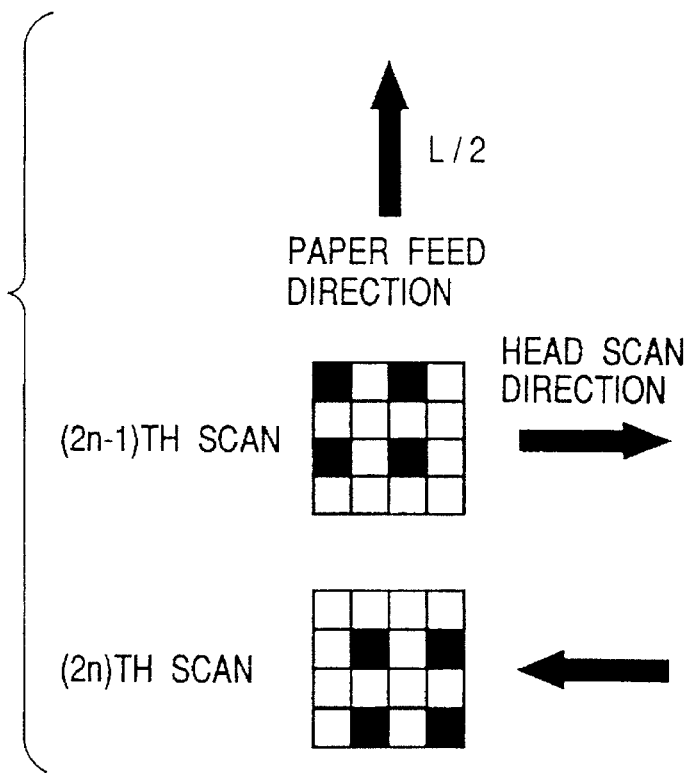
FIG. 7 illustrates another thinning method.
Figure 8:
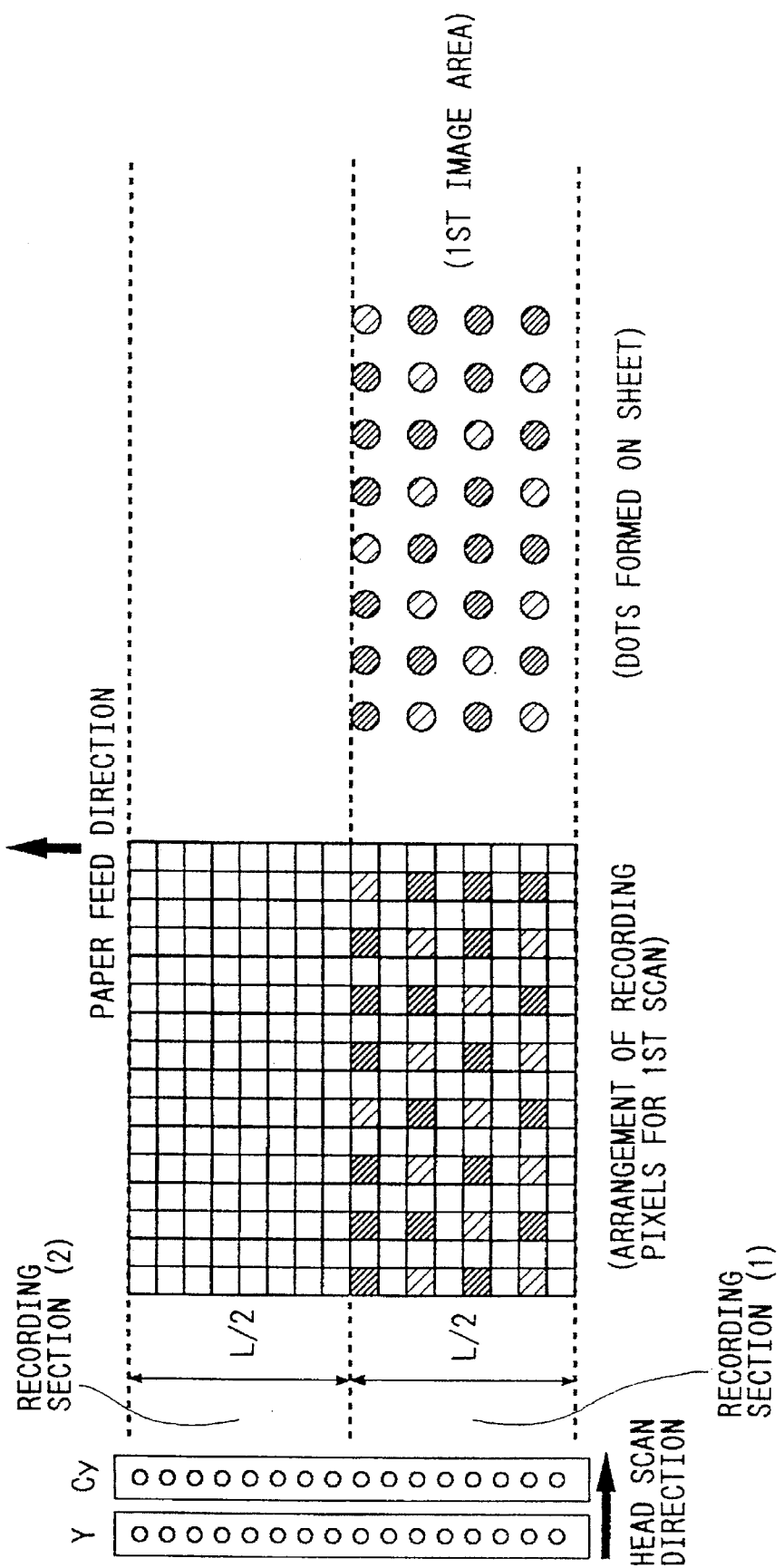
FIG. 8 shows discharge positions in the first scan when the thinned pattern shown in FIG. 7 is recorded and dot formation thereby.
Figure 9:
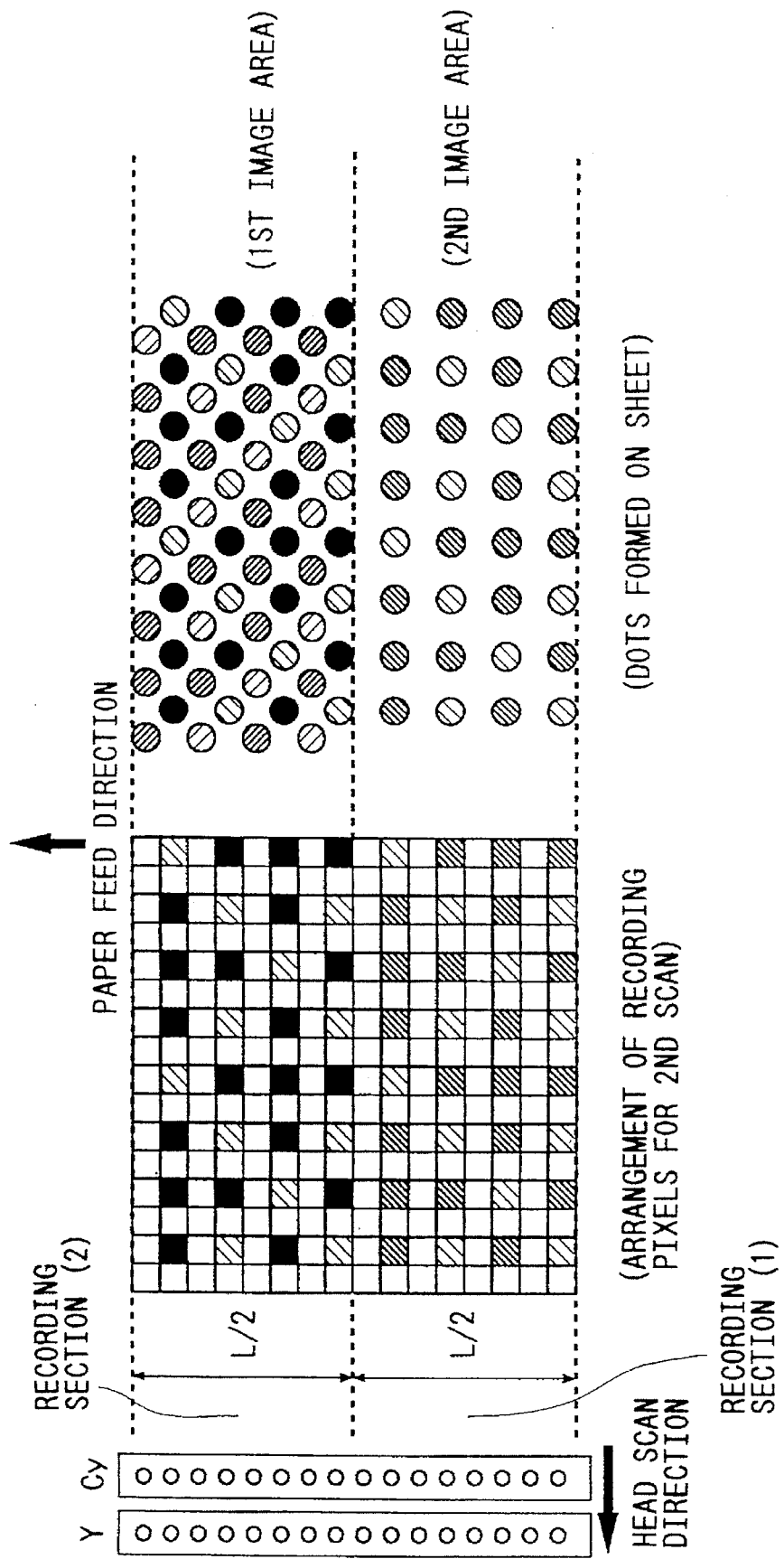
FIG. 9 shows discharge positions in the second scan when the thinned pattern shown in FIG. 7 is recorded and dot formation thereby.
Figure 10:
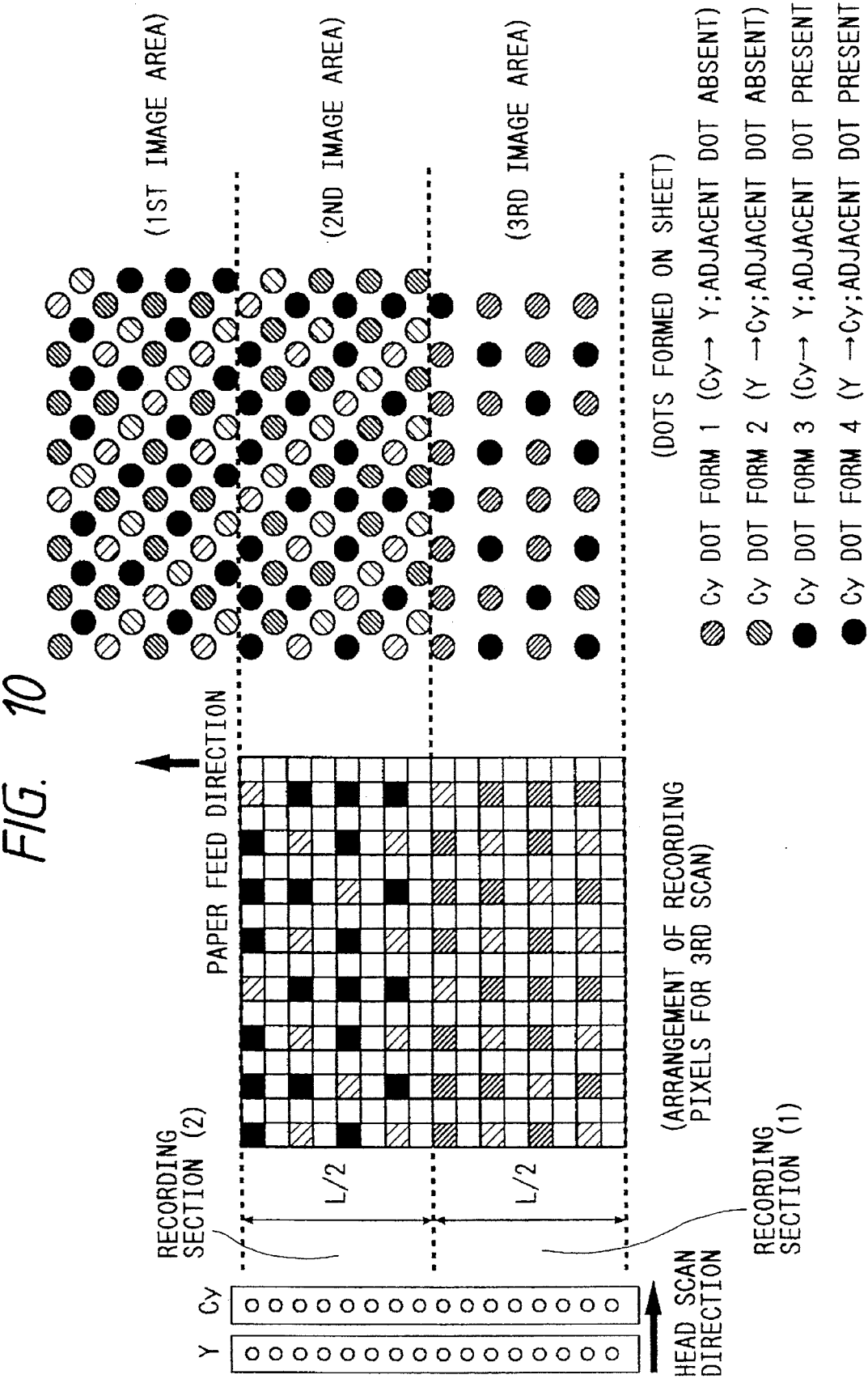
FIG. 10 shows discharge positions in the third scan when the thinned pattern shown in FIG. 7 is recorded and dot formation thereby.

An effect of the present embodiment is now specifically explained. To simplify the explanation, it is assumed that a 360 dpi 16-nozzle multi-nozzle head is used to record 180 dpi image data. It is also assumed that a half-tone color (yellowish green) having Cy 62.5% and Y 100% in print duty over-printed is printed as it is in the explanation of the prior art. Since the recording density of the recording head is double of that of the image data, the recording pixels of the same data always comprise adjacent 2×2=4 pixels, as shown in FIG. 5. FIG. 6 shows a thinned pattern of an image having the recording density of 360 dpi in the present embodiment.

Figure 2:
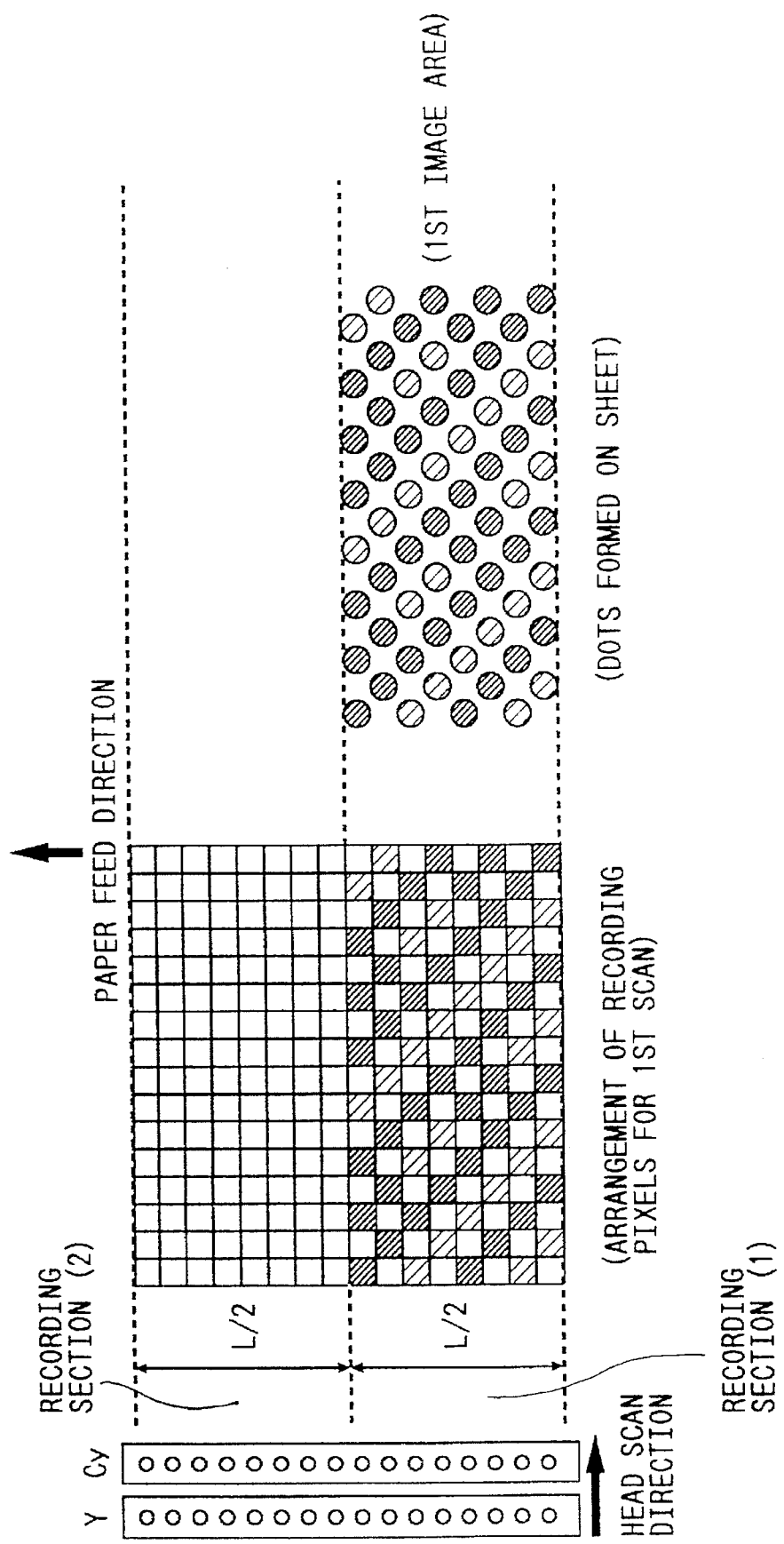
FIG. 2 shows discharge positions in a first scan in the first embodiment, and dot formation, thereby.

FIG. 2 shows recording pixels recorded by the Cy recording head and the Y recording head in the first scan in the L/2 sheet feed printing method of the present embodiment and resulting dot formation on the recording medium. A dark hatching pattern shows the recording by Cy and Y on the same recording pixel, and a light hatching pattern shows the recording by only Y. In the first scan, each recording head uses the eight nozzles of the recording section (1) to discharge the ink to the checker recording pixels of the first image area in the sequence of Bk-Cy-M-Y. As a result, in the recording pixel on the recording medium at which the Cy and Y image data are overlapped, the Y ink spreads around and beneath the Cy dots. Namely, the Cy dot recorded in the first scan in the first image area reaches the recording medium while no ink is present even at adjacent pixels. Thus, a relatively sharp image (Cy dot shape 1) appears. Then, the sheet is fed by L/2 width so that the first image area recorded in the first scan is moved toward the recording section (2).

Figure 3:
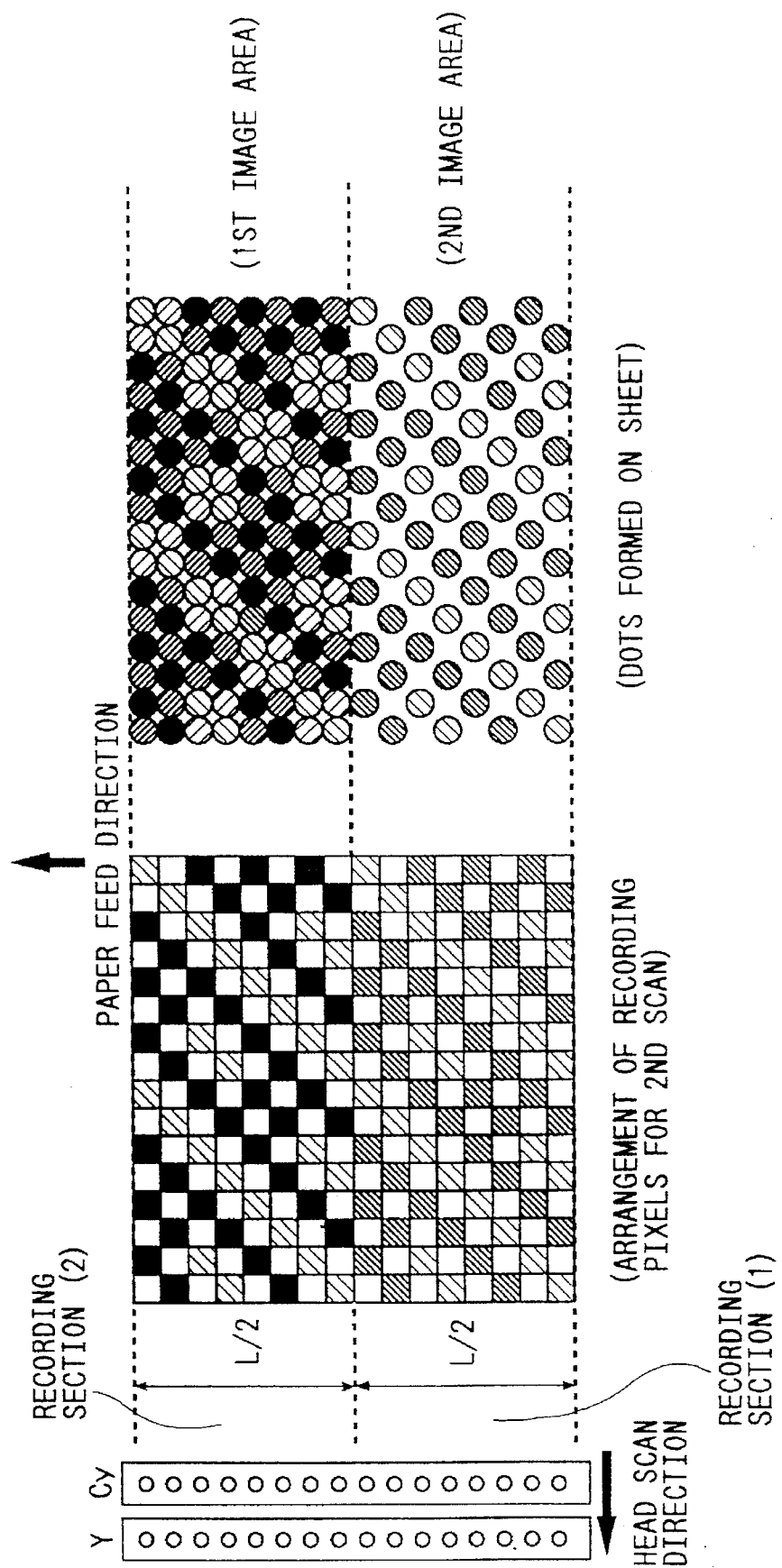
FIG. 3 shows discharge positions in a second scan in the first embodiment and dot formation thereby.

FIG. 3 shows recording pixels recorded in the second scan and the resulting dot formation on the recording medium. In the second scan (backward run scan), inks are discharged to the reverse checker recording pixels by the eight nozzles of the recording section (2) for the first image area, and by the light nozzles of the recording section (1) for the second image area, in the sequence of Y-M-Cy-Bk. The Cy dot recorded in the first image area in the second scan is recorded immediately after the Y dot in the second scan has reached in the reverse checker pattern on a gap adjacent to the Y dots printed in the checker pattern in the first scan. Accordingly, it is slightly larger and relatively obscure (Cy dot shape 4). The Cy dot recorded in the second image area in the second scan is recorded immediately after the Y ink has reached. Accordingly, it is less sharp than the Cy dot shape 1 but less obscure than the Cy dot shape 4 (Cy dot shape 2). Then, the sheet is fed by L/2 width so that the second image area is moved toward the recording section (2) and the third image area is moved toward the third image area.

Figure 4:
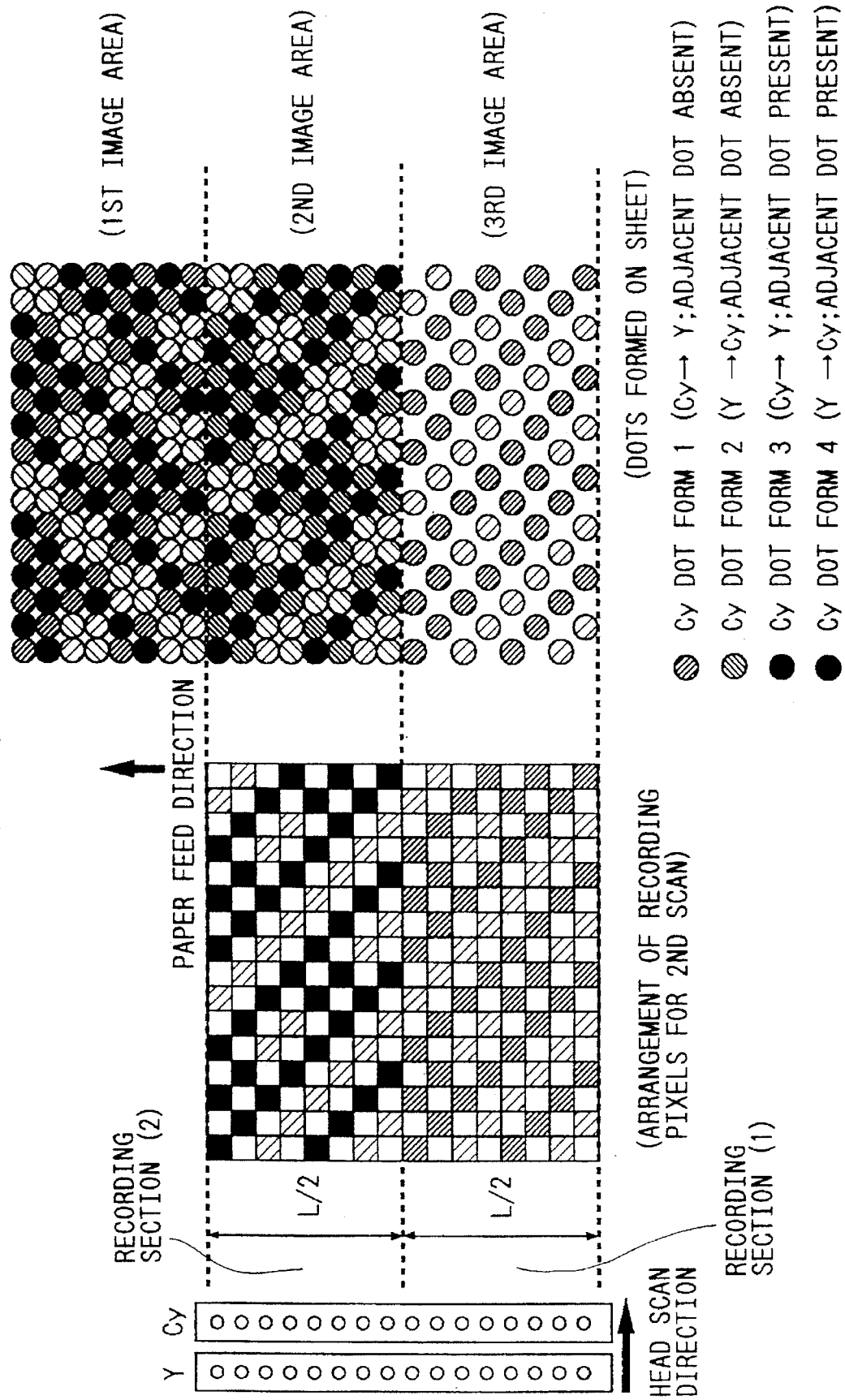
FIG. 4 shows discharge positions in a third scan in the first embodiment and dot formation thereby.

FIG. 4 shows recording pixels recorded in the third scan and resulting dot formation on the recording medium. In the third scan (forward run scan), inks are discharged to the checker recording pixels of the second image area by the four nozzles of the recording section (2), and of the third image area by the eight nozzles of the recording section (1), in the sequence of Bk-Cy-M-Y. The Cy dot recorded in the second image area in the third scan is recorded to a gap adjacent to the Y dots of the reverse checker pattern printed in the second scan. Accordingly, it is as sharp as the Cy dot shape 2 or slightly more obscure than the Cy dot shape 2 (Cy dot shape 3). The Cy dot recorded in the third image area in the third scan is ejected to the recording medium while no ink is present even in adjacent pixels like the first image area in the first scan. Accordingly, it is relatively sharp (Cy dot shape 1).

Then, the sheet is further fed by L/2 width, and the image areas are sequentially recorded by the two-run (forward run and backward run) recording head scan.

As described above, four different shapes of Cy dots are distributed in the respective image areas in the present embodiment. In the present embodiment, the numbers of Cy dots are equal in all image areas because uniform yellowish green image data is printed and they are equal in all recording scans because the checker pattern and the reverse checker pattern are printed by the recording head having the double recording density to that of the image data. The distribution of the Cy dot shapes in the respective image areas is now considered. In the odd-numbered image area, there are 40 Cy dot shapes 1 and 40 Cy dot shapes 4, and in the even-numbered image area, there are 40 Cy dot shapes 2 and 40 Cy dot shapes 3. As to the sharpness of the Cy dot shape, the Cy dot shape 1 is sharpest, and the larger the numeral is, the more obscure is the shape. Assuming that when viewed in macro the sharpness of the Cy dot shapes in each image area appears in average, the Cy dot shapes in all image areas appear equal when viewed in macro. Accordingly, in the present embodiment, it is seen that a difference between hues of the image areas is small even if color recording which results in prominent ununiformity of color is done in the reciprocal scan.

In the present invention, the feature of the L/n sheet feed printing method, that is, the reduction of the ununiformity of density due to the reach precision such as landing deviation and the amount of discharge is maintained and inks of different colors are properly overprinted or adjacently printed so that high quality color image recording is attained by the reciprocal scan without the regular ununiformity of color which is otherwise-easily produced for each scan when a half-tone color is blanket-printed. Thus, the recording speed and the image quality are improved.

In the present embodiment, the image data is thinned to the simple checker and reverse checker patterns, although the patterns are not limited to the checker patterns so long as the image data is thinned such that the numbers of dots in the recording scans are substantially equal. Namely, it is sufficient that the recording section (1) and the recording section (2) are complementary to each other and the numbers of dots when the image data is recorded in division are equal.

In the present invention, the thinned print factor in each recording section of the recording head is set to 50% so that the recorded image is completed in two scans. Where it is desired to increase the amount of ink ejection to improve the print density although fidelity to the image data is somewhat lost, the thinned print factor may be set to 75% so that the print factor reaches 150% in two scans. Conversely, where it is desired to reduce the ink ejection amount to eliminate the spread at the boundary of the inks, the thinned print factor may be set to 40% so that the print factor reaches 80% in two scans.

Where the recording medium is an OHP sheet or a non-coated sheet which has a low ink acceptance, the ink ejection amount is set lower by thinning the recording pixels without damaging the image data as shown in FIGS. 7 to 10 while unifying the numbers of recording dots in the respective recording scans.

In the present embodiment, the recording head having the double recording density to that of the image data is used to make the numbers of recording dots in the forth and back runs equal. Alternatively, in one-direction printing, the image data may be printed without reducing the pixel density, and when the reciprocal printing is selected, the pixel density of the image data is changed to less than one half in at least one direction and the thinning method is selected such that the numbers of dots in the forward and backward runs are equal. The change of the pixel density and the generation of the thinned image data may be effected by the ink jet recording apparatus or by a host apparatus such as a personal computer which sends the image data, in association with the ink jet printing apparatus.

In the description of the present embodiment, a general control method relating to the reciprocal recording such as a correction method of register data of the recording head, for the forward run scan and the backward run scan, relating to a spacing between recording heads and a print start position, and a correction of the sequence of drive, for the forward run scan and the backward run scan, relating to the time division drive of the multi-nozzle recording head, is omitted.

Second Embodiment

FIGS. 11 to 17 show a recording method in a second embodiment of the present invention.

In the present embodiment, the recording section (L) of the recording head is divided into four sections, 25% of the recording pixels is recorded in the first scan of each recording head, the sheet is then fed by L/4 width, another 25% of the recording pixels is printed in the second scan, the sheet is fed by L/4 width, further 25% is printed in the third scan, the sheet is fed by L/4 width, and the remaining 25% is printed in the fourth scan to complete the printing.

Figure 11:
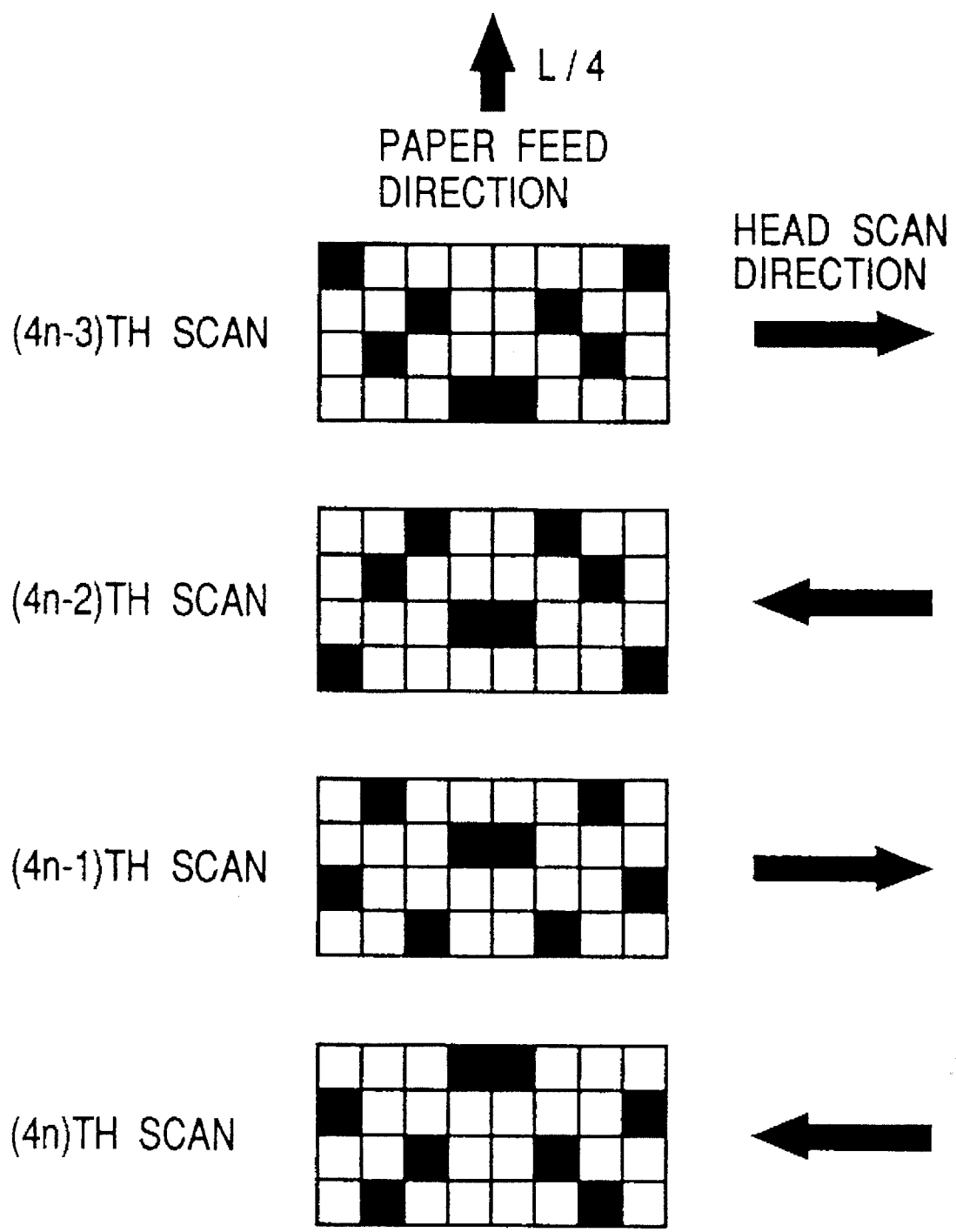
FIG. 11 illustrates a thinning method in a second embodiment.
Figure 12:
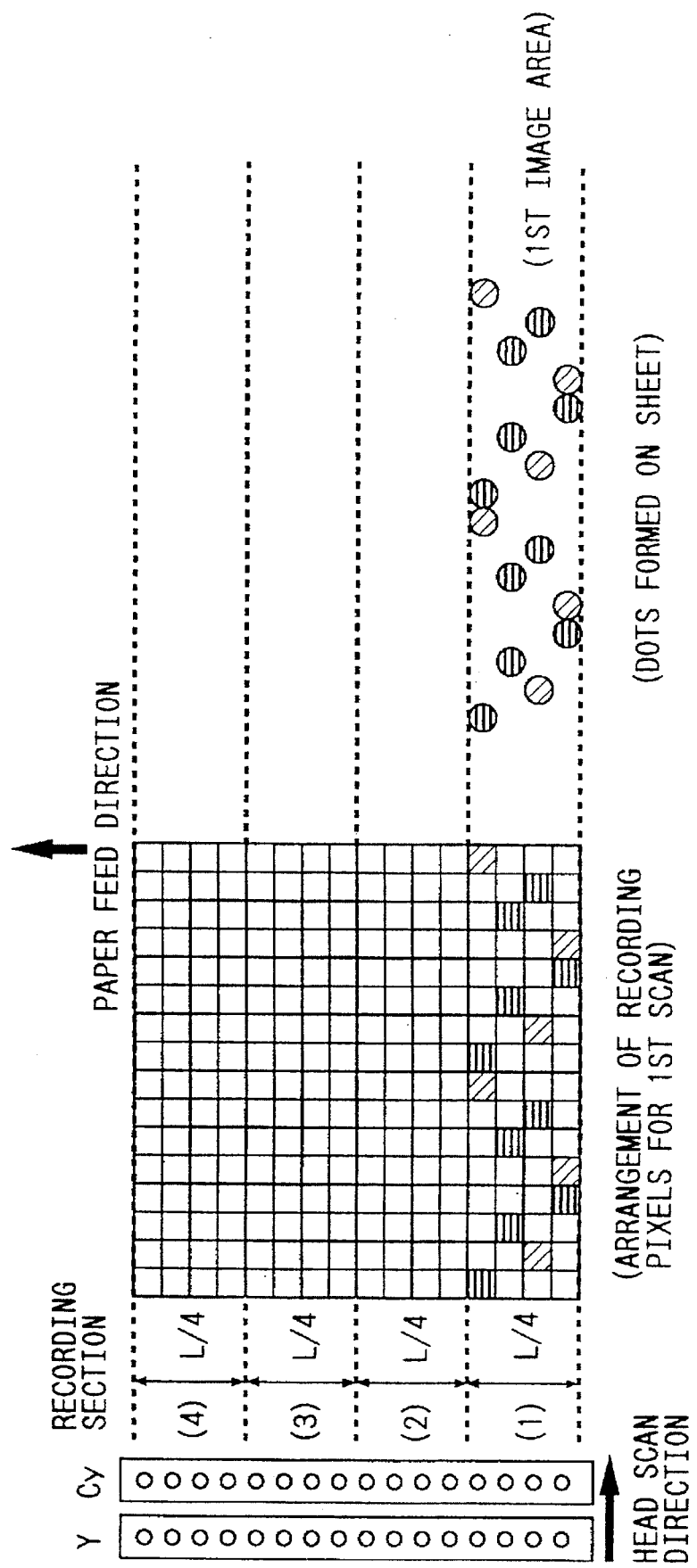
FIG. 12 shows dot formation in the first scan in the second embodiment.

In FIGS. 12 to 17, the discharge port line which is not actually visible is shown as a vertical perspective view for a sake of illustration. The image data and the recording heads are identical to those of the first embodiment. FIG. 11 illustrates a method of 25% thinning in the present embodiment. 4×8-pixel thinned pattern is used for each scan.

Figure 13:
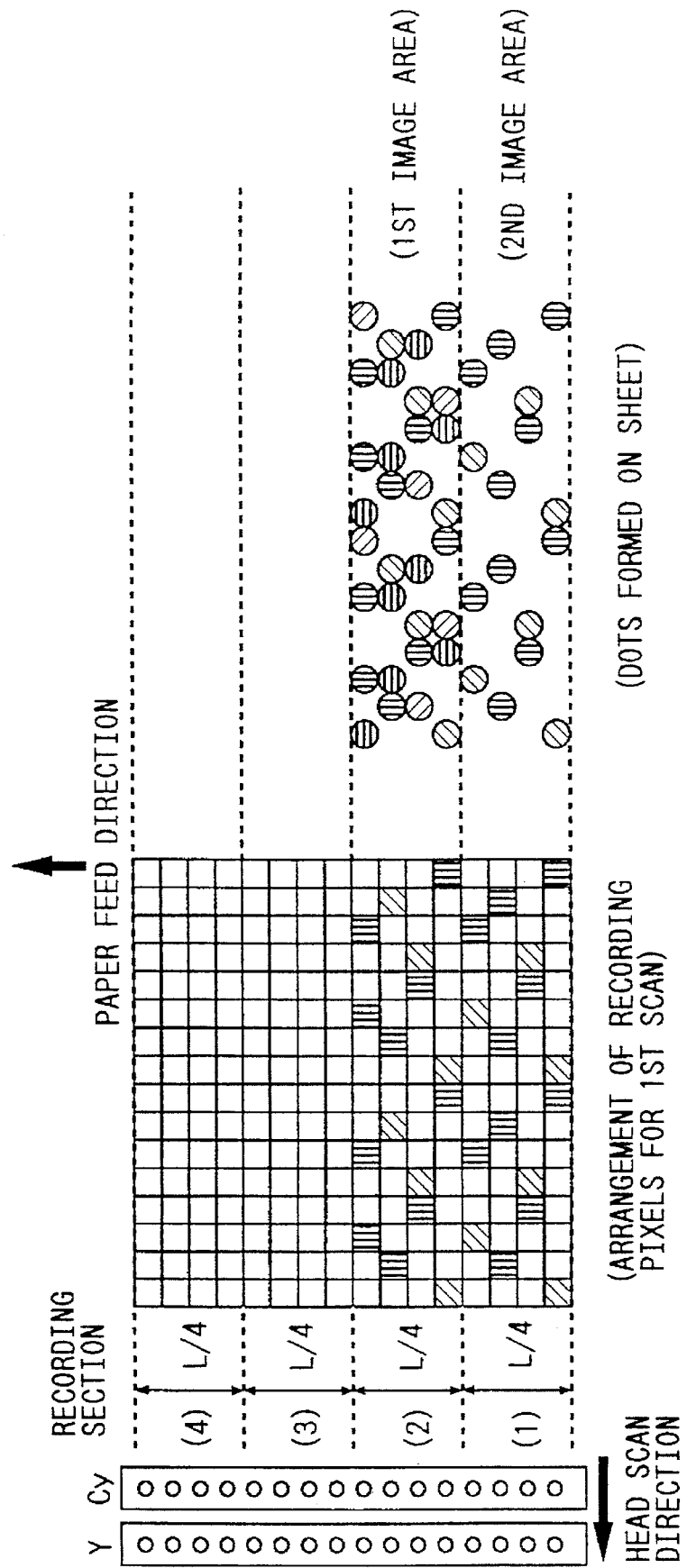
FIG. 13 shows dot formation in the second scan in the second embodiment.
Figure 14:
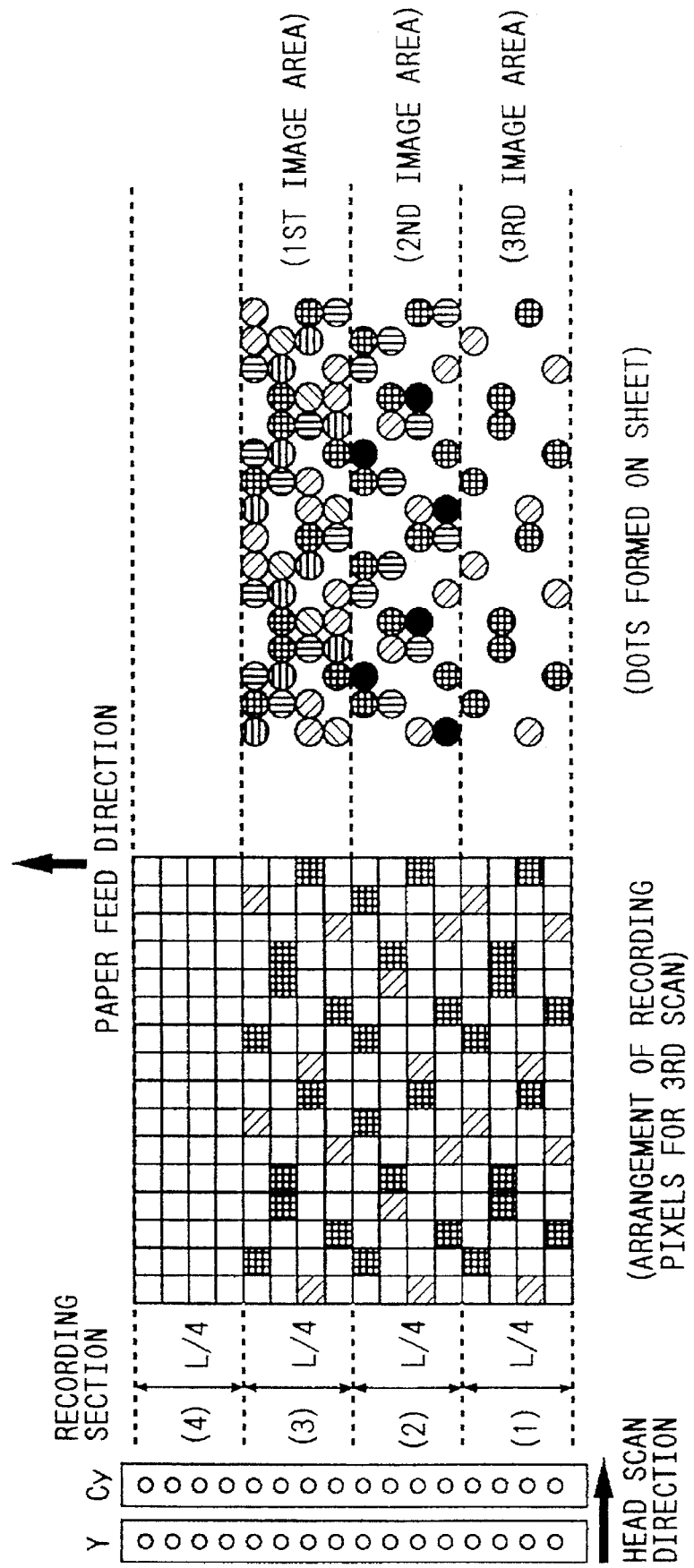
FIG. 14 shows dot formation in the third scan in the second embodiment.
Figure 15:
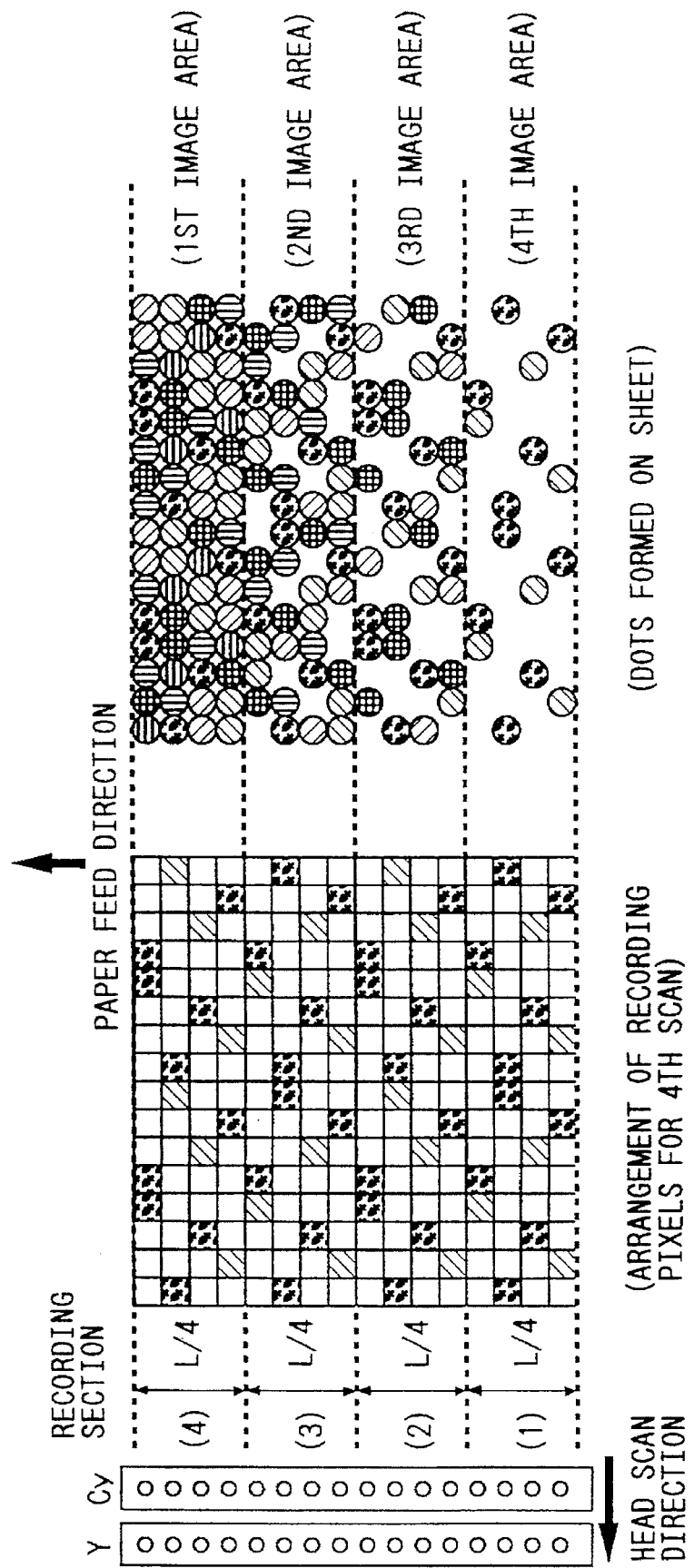
FIG. 15 shows dot formation in a fourth scan in the second embodiment.
Figure 16:
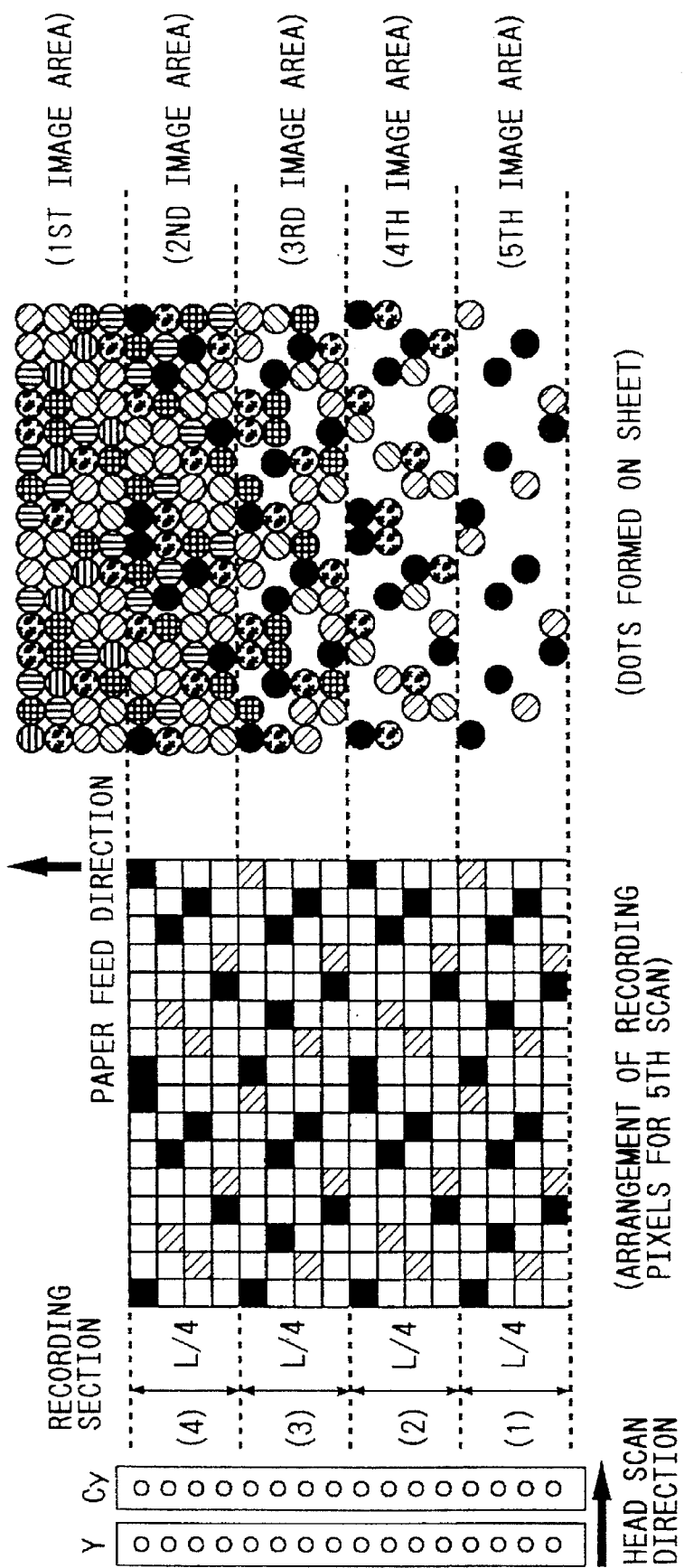
FIG. 16 shows dot formation in a fifth scan in the second embodiment.
Figure 17:
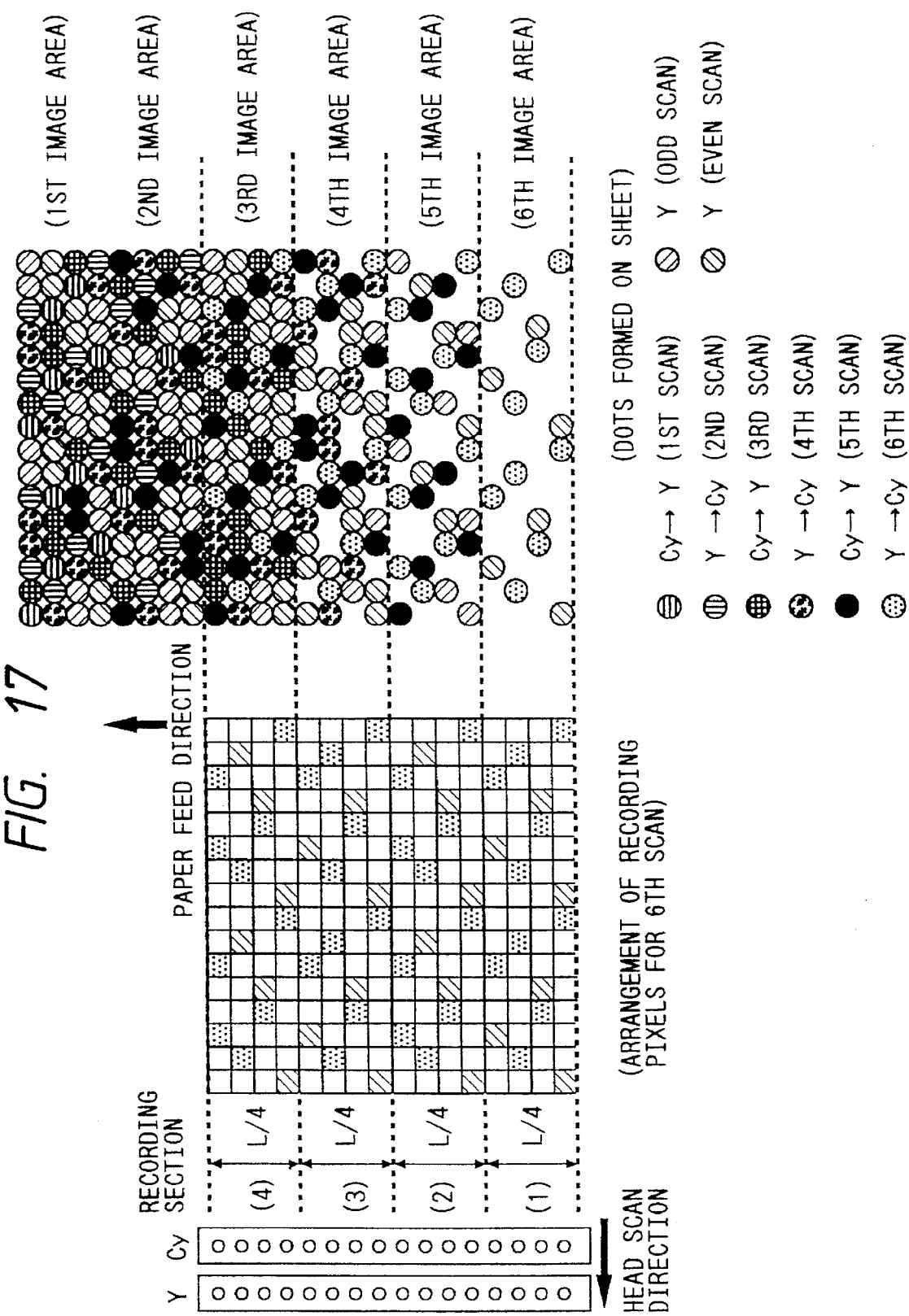
FIG. 17 shows dot formation in a sixth scan in the second embodiment.

Specific explanation is made with reference to FIGS. 12 to 17. In the first scan, the 25% thinned pattern is printed in the first image area by the four nozzles in the recording section (1) of the recording head. In the 25% thinning, the area corresponding to the (4n-3)th scan position shown in FIG. 11 is printed so that dots are formed on the sheet in the recording pixel arrangement shown in FIG. 12. Then, the sheet is fed by L/4 width so that the first image area recorded by the recording section (1) is moved to the recording section (2). In the second scan, the second image area and the first image area are printed by the recording section (1) and the recording section (2), respectively, in the backward head scan by the thinned pattern of the (4n-2)th scan shown in FIG. 11. FIG. 13 shows the recording in the second scan. Then, the sheet is fed by L/4 width so that the first image area is moved to the recording section (3) and the second image area is moved to the recording section (2). In the following third scan, the printing is made by the recording sections (1), (2) and (3) as shown in FIG. 14. In the third scan, the recording is made by the thinned pattern of the (4n-1)th scan shown in FIG. 11. Then, the sheet is fed by L/4 width and the recording is made by the thinned pattern of the 4n-th scan of FIG. 11, as shown in FIG. 15. Then, the recording is made as shown in FIGS. 16 and 17. The printing is completed by the subsequent similar sheet feed and head scan operations.

Noticing the dot formation in the first to third image areas of FIG. 17 in which the recording has been completed, each pixel of the original image data is formed by two dots by the forward run scan and the backward run scan. Accordingly, in the present embodiment, the hue is uniform when viewed in macro, and the ununiformity of color is not observed. Unlike the previous embodiment, since each pixel of the original image data is recorded by the four different nozzles, the uniformity of density due to the nozzles and the connecting line due to the sheet feed are not prominent and a high quality of image is attained. In the present embodiment, since the amount of ink ejection in each scan is suppressed compared to the first embodiment, the spread at the boundary is more hard to occur.

The features of the L/n sheet feed printing, that is, the reduction of the ununiformity of density due to the reach precision such as landing deviation and the amount of discharge is maintained while the occurrence of the regular ununiformity of color which otherwise is caused in printing half-tone color by printing inks of different colors in overlap or adjacently is prevented. Thus, a high quality color image recording is attained by the reciprocal printing.

Third Embodiment

A third embodiment of the present invention is now explained.

Figure 22:
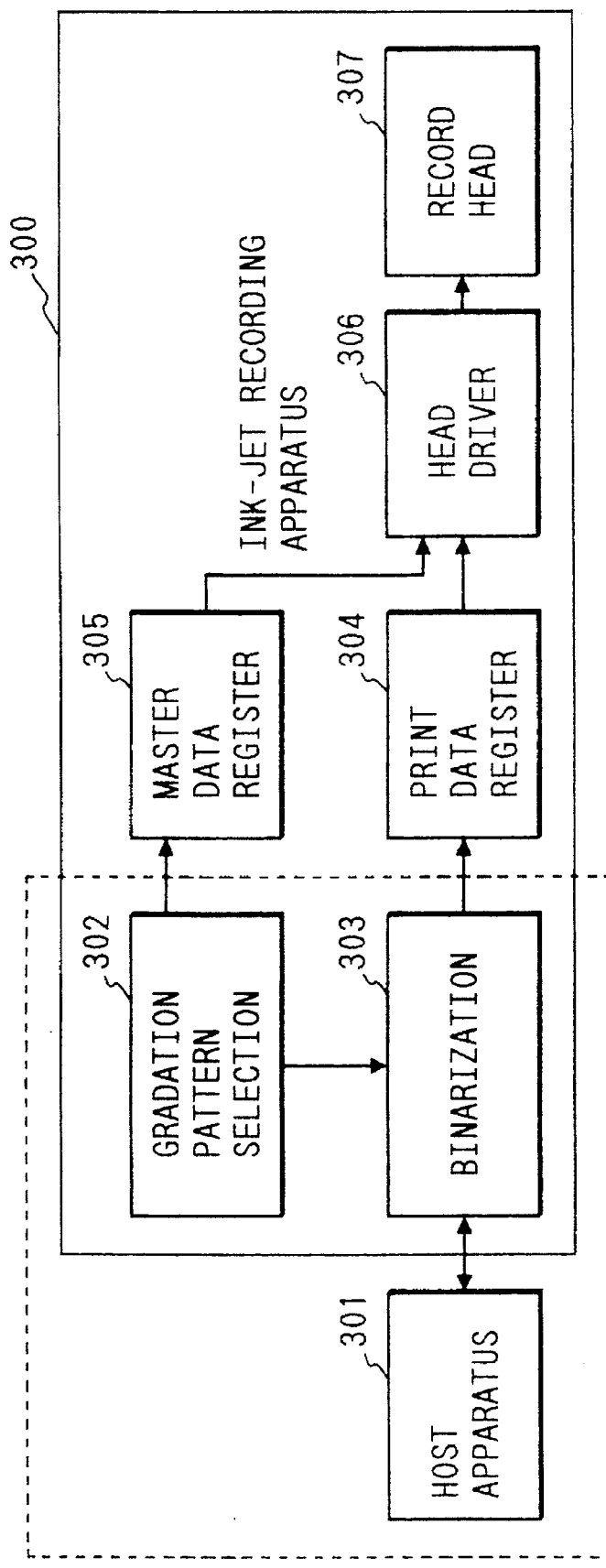
FIG. 22 shows a block diagram of an image data flow of an ink jet recording apparatus in the third embodiment.

In the present embodiment, it is assumed that the pixel density of the image data and the recording density of the recording apparatus are equal. FIG. 22 shows a data flow block diagram of the ink jet recording apparatus of the present embodiment. In the present embodiment, an ink jet recording apparatus 300 receives gradation data from a host apparatus 301 as numeric data s, and the recording apparatus 300 records a specified area by half-tone recording in accordance with a predetermined area gradation method such as a dither method or an error diffusion method. A predetermined half-tone image area is developed into binary data by a binarizing unit 303 in accordance with a gradation pattern selected by a gradation pattern selection unit 303 by a key entry from a console unit and the binary data is stored in a print data register 304. A thinned pattern (masked data) for the gradation pattern is selected from a masked data register 305 in accordance with the gradation pattern and a recording head 307 is driven by a head driver 306. FIGS. 18 to 21 show combinations of the area gradation pattern and the thinned pattern. 64 gradations are expressed by 8×8=64 pixel matrices. Dots are generated in the sequence of numerals 1 to 64 in accordance with the designation for the number of gradations. For example, for gradation level 12, dots are generated by pixels 1 to 12, and for gradation level 48, dots are generated by pixels 1 to 48. Recording pixels for the forward run scan and the backward run scan are respectively shown in the drawings. FIGS. 18 and 19 show a recording method which uses two different thinned patterns (1 and 2) for the gradation pattern 1 in which pixels are relatively scattered. This recording method is same as that of the first embodiment in which the recording head is divided into two sections, and the image areas are recorded by the two-run scan (reciprocal scan) while the sheet is fed by one-half of the recording width of the recording head. In FIG. 18, even if the gradation level changes, a difference of the numbers of recorded dots between the forward run scan and the backward run scan is one at most, and a difference of hues is very small as described above. On the other hand, in FIG. 19, a difference of the number of recorded dots may be two or more at certain gradation levels and a difference of hues may appear slightly. Thus, the thinned pattern 1 is preferable to the gradation pattern 1. FIGS. 20 and 21 show a recording method which uses the thinned patterns 1 and 2 for a gradation pattern 2 in which the number of dots increases starting from a certain pixel, as the gradation level increases. As seen from FIGS. 20 and 21, the thinned pattern 2 is better for the gradation pattern 2 because a difference of the number of dots between the forward and backward run scans is smaller.

As described above, because the occurrence of the ununiformity of color in the image is affected by the combination of the gradation pattern and the thinned pattern, the thinned pattern is selected in accordance with the gradation pattern in the present embodiment.

Namely, when the gradation pattern 1 is selected, the thinned pattern 1 is selected, and when the gradation pattern 2 is selected, the thinned pattern 2 is selected.

In the present embodiment, the reciprocal color printing which is free from the ununiformity of color is attained while the recording density of the recording apparatus is utilized at a maximum level.

In the present embodiment, the dots of the gradation pattern is developed by thee ink jet recording apparatus. Alternatively, it may be done by the host apparatus as shown by broken lines in FIG. 25. In this case, selection information for the gradation pattern may be sent from the host apparatus to automatically select the thinned pattern, or a user may manually set the thinned pattern of the ink jet recording apparatus.

Where the gradation patterns in the host apparatus are substantially fixed, the thinned patterns of the ink jet recording apparatus may be prepared to avoid the interference and fixed.

In accordance with the present embodiment, the recording means is moved back and forth relative to the recording medium to conduct the main scan for each run, and the color thinned images are sequentially recorded on the same area of the recording medium by using different blocks of the recording means in the plurality of main scans, and the numbers of dots recorded in the respective main scan are maintained equal without regard to the image data. Accordingly, the ununiformity of density due to the deposition accuracy of the recording means and the amount of discharge is eliminated.

Further, since the substantially same number of dots are recorded in each main scan without regard to the image data, the occurrence of the regular ununiformity of color due to the difference in the sequence of ink ejection in the forward and backward run scans is prevented.

In the present invention, the ink jet recording apparatus which utilizes thermal energy to form flying droplets to record data has been described. Representative construction and principle thereof are disclosed in U.S. Pat. No. 4,723,129 and U.S. Pat. No. 4,740,796. The present invention is applicable to both on-demand type and continuous type. In the on-demand type, at least one drive signal which is associated with the record information and imports a rapid temperature rise above a boiling point may be applied to an electro-thermal transducer arranged in association with a sheet which retains liquid (ink) or a liquid path so that thermal energy is generated in the electro-thermal transducer to cause film boiling in a thermal action plane of the recording head. As a result, air bubbles are formed in the liquid (ink) in association with the drive signal. The liquid (ink) is discharged through discharge ports by the growth and shrinkage of the air bubbles to form at least one droplet. Where the drive signal is pulsive, the growth and shrinkage of the air bubbles are effected instantly so that highly responsive liquid (ink) discharge is attained.

A preferable pulsive drive signal is one disclosed in U.S. Pat. No. 4,463,359 or U.S. Pat. No. 4,345,262. When the condition disclosed in the above-mentioned U.S. Pat. No. 4,313,124 relating to the temperature rise rate of the thermal action plane is met, more excellent recording is attained.

The construction of the recording head may be a combination of discharge ports, liquid paths and electro-thermal transducers (linear liquid path or orthogonal liquid path) as disclosed in the above-mentioned USP's, or a construction in which the thermal action element is arranged in a curved area as disclosed in U.S. Pat. No. 4,558,333 or U.S. Pat. No. 4,459,600.

Alternatively, a construction in which a slit common to a plurality of electro-thermal transducers is used as discharge ports of the electro-thermal transducer as disclosed in Japanese Laid-Open Patent Application No. 59-123670, or a construction in which openings for absorbing pressured liquid of thermal energy are associated with discharge ports as disclosed in Japanese Laid-Open Patent Application No. 59-138461 may be used.

In a full line type recording head having a length corresponding to a maximum width of a recording medium which the recording apparatus can print on, the length requirement may be met by a combination of a plurality of recording heads disclosed in the above-mentioned patents, or a single integral recording head may be used.

The present invention is also effective to a replaceable chip type recording head which, when mounted in an apparatus, is electrically connected with the apparatus and supplied with ink from the apparatus, or a cartridge type recording head in which an ink tank is integrally provided in the recording head.

The addition of recovery means to the recording head or auxiliary means is preferable because it further stabilizes the effect of the present invention. Specifically, capping means to the recording head, cleaning means, pressurizing or suction means, preliminary heating means by an electro-thermal transducer or other heating element or a combination thereof, and preliminary discharge mode separately from the recording are effective to attain the stable recording.

The recording mode of the recording apparatus may include only a principal color recording mode such as black.

In the embodiments of the present invention, the ink is used as the liquid. Ink which is solidified below a room temperature and softened or liquidified at the room temperature, or ink which is in liquid state when a record signal is applied may also be used because in the ink jet recording system it is usual to temperature control the ink within a range of 30° C. to 70° C. to keep the viscosity of the ink within a stable discharge range.

Further alternatively, the temperature rise by the thermal energy may be prevented by using it as energy for a status transition of the ink from a solid state to a liquid state, or ink which is solidified when it is left may be used to prevent vaporization of the ink. In any case, ink which is liquidified by the application of thermal energy in response to a second signal and discharged as liquid ink, or ink which is liquidified by the thermal energy and starts to be solidified before it reaches the recording medium may be used. The ink may be kept to face the electro-thermal transducer while it is held in porous sheet recesses or via-holes in a liquid or solid state, as disclosed in Japanese Laid-Open Patent Application No. 54-56847 or Japanese Laid-Open Patent Application No. 60-71260. In the present invention, the film boiling system mentioned above is most effective to those inks.

The recording apparatus in the present invention may be a word processor, an image output terminal of an information handling system such as a computer, either integral or separate, a copying apparatus combined with a reader, or a facsimile apparatus having transmitting and receiving functions.

What is claimed is:

1. An ink jet recording method for reciprocally moving recording means for recording, said recording means having a plurality of recording element lines for discharging respective different color ink droplets, said recording means being moved relative to a recording medium in a main scan direction, to record a color image corresponding to image data on the recording medium, and for moving said recording medium relative to said recording in a sub-scan direction different from said main scan direction, comprising:

a first step of recording an image corresponding a first thinned pattern for each color to a predetermined area of the recording medium by using a first recording section of said recording means in a forward movement in main scan direction of said recording means;

a second step of moving said recording medium relative to said recording means in the sub-scan direction after the forward movement of said recording means; and a third step of recording an image corresponding to a second thinned pattern for each color to said predetermined area of said recording medium by using a second recording section of said recording means in a backward movement in the main scan direction of said recording means, wherein said first thinned pattern and said second thinned pattern are complementary to each other and are set such that a number of dots recorded in each of said first step and said third step are substantially equal without regard to the image data.

2. An ink jet recording method according to claim 1, wherein a recording density of said recording means is double of a recording density of said image data, each pixel of the image data is recorded by a plurality of recording dots, and a same number of the recording dots of each said pixel are recorded in the forward movement and the backward movement.

3. An ink jet recording method according to claim 2 wherein said first thinned pattern has a dot arrangement by which dots which are not vertically and horizontally adjacent are recorded, and said second thinned pattern has a dot arrangement by which remaining said dots not recorded by the first thinned pattern are recorded.

4. An ink jet recording method according to claim 2 wherein said recording means includes a plurality of recording heads each having a plurality of ink discharge ports for discharging inks of different colors.

5. An ink jet recording method according to claim 1 wherein said recording means includes a plurality of recording heads each having a plurality of ink discharge ports for discharging inks of different colors.

6. An ink jet recording method according to claim 1 wherein said image data is formed in accordance with an area gradation method of a predetermined dot arrangement, and said first and second thinned patterns are dot arrangement patterns asynchronous with the dot arrangement Of the area gradation method.

7. An ink jet recording method according to claim 6 wherein said area gradation method is a dither method.

8. An ink jet recording method according to claim 1 wherein said recording means causes a status change in an ink by thermal energy to discharge the ink from the discharge port.

9. An ink jet recording apparatus for recording a color image corresponding to image data to a recording medium by using recording means for recording, said recording means having a plurality of recording element lines for discharging respective different color ink droplets, comprising:

first move means for reciprocally moving said recording means relative to said recording medium in a main scan direction;

drive means for driving said recording means in accordance with the image data and a first thinned pattern in a forward movement in the main scan direction of said recording means by said first move means and driving said recording means in accordance with the image data and a second thinned pattern in a backward movement in the main scan direction of said recording means by said first move means;

said first and second thinned patterns being complementary to each other; and second move means for moving said recording medium relative to said recording means in a sub-scan direction after each the forward movement of said recording means and the backward movement of said recording means;

said drive means recording an image in accordance with the image data and the first thinned pattern to a predetermined area on said recording medium by using a first recording section of said recording means in the forward movement of said recording means by said first move means, and recording an image in accordance with the image data and the second thinned pattern to said predetermined area on said recording medium by using a second recording section of said recording means in the backward movement of said recording means by said first move means after the sub-scan by said second move means;

said first and second thinned patterns being set much that the numbers of dots recorded in the forward movement of said recording means and the backward movement of said recording means are substantially equal without regard to the image data.

10. An ink jet recording apparatus according to claim 9 wherein a recording density of said recording means is double of a recording density of said image data, each pixel of the image data is recorded by a plurality of recording dots, and a same number of the recording dots of each said pixel are recorded for each of the forward movement and the backward movement.

11. An ink jet recording apparatus according to claim 10 wherein said first thinned pattern has a dot arrangement by which dots which are not vertically and horizontally adjacent are recorded, and said second thinned pattern has a dot arrangement by which remaining said dots not recorded by the first thinned pattern are recorded.

12. An ink jet recording apparatus according to claim 10 wherein said recording means includes a plurality of recording heads each having a plurality of ink discharge ports for discharging inks of different colors.

13. An ink jet recording apparatus according to claim 9 wherein said recording means includes a plurality of recording heads each having a plurality of ink discharge ports for discharging inks of different colors.

14. An ink jet recording apparatus according to claim 9 wherein said image data is formed in accordance with an area gradation method of a predetermined dot arrangement, and said first and second thinned patterns are dot arrangement patterns asynchronous with the dot arrangement of the area gradation method.

15. An ink jet recording apparatus according to claim 14 wherein said area gradation method is a dither method.

16. An ink jet recording apparatus according to claim 9 wherein said recording means causes a status change in an ink by thermal energy to discharge the ink from the discharge port.

17. An ink jet recording method for performing a relative movement of a recording means for recording, said recording means having a plurality of recording element lines for discharging respective different color ink droplets, relative to a recording medium in a main scan direction, said recording means recording a color image corresponding to an image data on the recording medium during the relative movement, and thereafter performing a relative movement of said recording medium relative to said recording means in a sub-scan direction that is different from said main scan direction, said method comprising:

a first step of providing a set of thinned patterns which are complementary to each other, said thinned patterns corresponding to an area gradation pattern for processing said image data;

a second step of recording on a predetermined area of said recording medium a first thinned image corresponding to said image data which is processed based on the area gradation pattern, using a given one of the set of thinned patterns which was provided in said first step, during a first relative movement of said recording means in the main scan direction; and a third step of recording on the predetermined area of said recording medium a second thinned image corresponding to said image data which is processed based on the area gradation pattern, using another given one of the set of thinned patterns which was provided in said first step, during a second relative movement of said recording means in the main scan direction, said second thinned image being complementary to said first thinned image, wherein said given thinned pattern and said another given thinned pattern are complementary to each other and are set such that a number of dots recorded in each of said second step and said third step are substantially equal without regard to the image data.

18. A method according to claim 17, wherein in said first step, said set of thinned patterns is selected from a plurality of thinned patterns that renders less of a difference between a first number of dots recorded during the first relative movement and a second number of dots recorded during the second relative movement with regard to every gradation level reproducible by the area gradation pattern.

19. A method according to claim 17, wherein in said second step, the first thinned image is recorded using a first recording section of said recording means, and in said third step, the second thinned image is recorded using a second recording section of the recording means.

20. A method according to claim 19, further comprising a step of moving said recording medium relative to said recording means in a sub-scan direction by a distance that corresponds to the first recording section before starting recording of the second thinned image following recording of the first thinned image.

21. A method according to claim 17, wherein the first relative movement and the second relative movement are in opposite directions.

22. A method according to claim 17, wherein the area gradation pattern is based upon a dither method.

23. A method according to any of claims 17 to 22, wherein said recording means has a plurality of recording heads each of which is equipped with a plurality of recording elements, wherein said recording heads respectively discharge different color inks.

24. A method according to claim 23, wherein said recording element causes a change in a state of the ink by applying thermal energy to said ink, thereby discharging ink droplets from a discharge port.

25. A method according to any of claims 17 to 22, wherein said recording element causes a change in a state of the ink by applying thermal energy to said ink, thereby discharging ink droplets from a discharge port.

26. An ink jet recording apparatus for recording a color image on a recording medium using a recording means for recording, said recording means having a plurality of recording element lines for discharging respective different color ink droplets, comprising:

input means for inputting a signal indicating an area gradation pattern for processing an image data;

providing means for providing a set of thinned patterns which are complementary to each other in response to the signal indicating an area gradation pattern inputted by said input means;

first move means for reciprocatingly moving said recording means relative to said recording medium in a main scan direction; and drive means for driving said recording means in accordance with the image data which is processed based on the area gradation pattern and the set of thinned patterns provided by said providing means, wherein said drive means drives said recording means, using a given one of the set of thinned patterns, during a first relative movement of said recording means by said first move means, and drives said recording means using another given one of the set of thinned patterns, during a second relative movement of said recording means by said first move means, whereby a first thinned image is recorded on a predetermined area of said recording medium during the first relative movement and a second thinned image complementary to the first thinned image is recorded on the predetermined area of said recording medium during the second relative movement, and wherein said given thinned pattern and said another given thinned pattern are complementary to each other and are set such that a number of dots recorded for each of said first thinned image and said second thinned image are substantially equal without regard to the image data.

27. An apparatus according to claim 26, wherein said set of thinned patterns provided from a plurality of thinned patterns by said providing means is such as to render less of a difference between a first number of dots recorded during the first relative movement and a second number of number of dots recorded during the second relative movement with regard to every gradation level reproducible by the area gradation pattern.

28. An apparatus according to claim 26, wherein said drive means drives said recording means to record the first thinned image on the recording area of said recording medium by using a first recording section of said recording means and to record on the recording area of said recording medium the second thinned image by using a second recording section of said recording means.

29. An apparatus according to claim 28, further comprising second move means for moving said recording medium relative to said recording means in the sub-scan direction which is different from the main direction by a distance that corresponds to the first recording section before starting recording of the second thinned image following recording of the first thinned image.

30. An apparatus according to claim 26, wherein the first relative movement and the second relative movement in opposite directions.

31. An apparatus according to claim 26, wherein the area gradation pattern is based upon a dither method.

32. An apparatus according to any of claims 26 to 31, wherein said recording means has a plurality of recording heads each of which is equipped with a plurality of recording elements, wherein said recording heads respectively discharge different color inks.

33. An apparatus according to claim 32, wherein said recording element causes a change in a state of the ink by applying thermal energy to said ink, thereby discharging ink droplets from a discharge port.

34. An apparatus according to any of claims 26 to 31, wherein said recording element causes a change in a state of the by applying thermal energy to said ink, thereby discharging ink droplets from a discharge port.

35. An ink jet recording method for performing relative movement of a recording means for recording, said recording means having a plurality of recording element lines for discharging respective different color ink droplets, relative to a recording medium in a main scan direction, said recording means recording a color image corresponding to an image data on the recording medium during the relative movement, and thereafter performing a relative movement of said recording medium relative to said recording means in a sub-scan direction that is different from said main scan direction, said method comprising:

a first step of selecting a set of thinned patterns which are complementary to each other, said thinned patterns corresponding to an area gradation pattern for processing said image data;

a second step of recording on a predetermined area of said recording medium a first thinned image corresponding to said image data which is processed based on the area gradation pattern, using a given one of the set of thinned patterns which was selected in said first step, during a first relative movement of said recording means in the main scan direction; and a third step of recording on the predetermined area of said recording medium a second thinned image corresponding to said image data which is processed based on the area gradation pattern, using another given one of the set of thinned patterns which was selected in said first step, during a second relative movement of said recording means in the main scan direction, said second thinned image being complementary to said first thinned image, wherein in said first step, said set of thinned patterns is selected from a plurality of thinned patterns to reduce a difference between a first number of dots recorded during the first relative movement and a second number of dots recorded during the second relative movement with regard to a gradation level reproducible by the area gradation pattern, without regard to the image data.

36. A method according to claim 35, wherein in said second step, the first thinned image is recorded using a first recording section of said recording means, and in said third step, the second thinned image is recorded using a second recording section of the recording means.

37. A method according to claim 36, further comprising a step of moving said recording medium relative to said recording means in the sub-scan direction by a distance that corresponds to the first recording section before starting recording of the second thinned image following recording of the first thinned image.

38. A method according to claim 35, wherein the first relative movement and the second relative movement are in opposite directions.

39. A method according to claim 35, wherein the area gradation pattern is based upon a dither method.

40. A method according to any of claims 35-39, wherein said recording means has a plurality of recording heads each of which is equipped with a plurality of recording elements, wherein said recording heads respectively discharge different color inks.

41. A method according to claim 40, wherein said recording element causes a change in a state of the ink by applying thermal energy to said ink, thereby discharging ink droplets from a discharge port.

42. A method according to any of claims 35 to 39, wherein said recording element causes a change in a state of the ink by applying thermal energy to said ink, thereby discharging ink droplets from a discharge port.

43. An ink jet recording apparatus for recording a color image on a recording medium using a recording means for recording, said recording means having a plurality of recording element lines for discharging respective different color ink droplets, comprising:

input means for inputting a signal indicating an area gradation pattern for processing an image data;

selection means for selecting a set of thinned patterns which are complementary to each other in response to the signal indicating an area gradation pattern inputted by said input means;

first move means for reciprocatingly moving said recording means relative to said recording medium in a main scan direction; and drive means for driving said recording means in accordance with the image data which is processed based on the area gradation pattern and the set of thinned patterns selected by said selection means, wherein said drive means drives said recording means, using a given one of the set of thinned patterns, during a first relative movement of said recording means by said first move means, and drives said recording means using another given one of the set of thinned patterns, during a second relative movement of said recording means by said first move means, whereby a first thinned image is recorded on a predetermined area of said recording medium during the first relative movement and a second thinned image complementary to the first thinned image is recorded on the predetermined area of said recording medium during the second relative movement and, wherein said set of thinned patterns selected from a plurality of thinned patterns by said selection means is such as to reduce a difference between a first number of dots recorded during the first relative movement and a second number of number of dots recorded during the second relative movement with regard to a gradation level reproducible by the area gradation pattern, without regard to the image data.

44. An apparatus according to claim 43, wherein said drive means drives said recording means to record the first thinned image on the recording area of said recording medium by using a first recording section of said recording means and to record on the recording area of said recording medium the second thinned image by using a second recording section of said recording means.

45. An apparatus according to claim 44, further comprising second move means for moving said recording medium relative to said recording means in the sub-scan direction which is different from the main direction by a distance that corresponds to the first recording section before starting recording of the second thinned image following recording of the first thinned image.

46. An apparatus according to claim 43, wherein the first relative movement and the second relative movement in opposite directions.

47. An apparatus according to claim 43, wherein the area gradation pattern is based upon a dither method.

48. An apparatus according to any of claims 43 to 47, wherein said recording means has a plurality of recording heads each of which is equipped with a plurality of recording elements, wherein said recording heads respectively discharge different color inks.

49. An apparatus according to claim 38, wherein said recording elements cause a change in a state of the ink by applying thermal energy to said ink, thereby discharging ink droplets from a discharge port.

50. An apparatus according to any of claims 43–47, wherein said recording element causes a change in a state of the by applying thermal energy to said ink, thereby discharging ink droplets from a discharge port.

51. An ink jet recording method for reciprocally moving recording means for recording, said recording means having a plurality of recording element lines for discharging respective different color ink droplets, said recording means being moved relative to a recording medium in a main scan direction, to record a color image corresponding to image data on the recording medium, and for moving said recording medium relative to said recording means in a sub-scan direction different from said main scan direction, comprising:

a first step of recording an image corresponding to a first thinned pattern for each color to a predetermined area of the recording medium by using a first recording section of said recording means in a forward movement in the main scan direction of said recording means;

a second step of moving said recording medium relative to said recording means in the sub-scan direction after the forward movement of said recording means; and a third step of recording an image corresponding to a second thinned pattern for each color to said predetermined area of said recording medium by using a second recording section of said recording means in a backward movement in the main scan direction of said recording means, wherein an image recorded in accordance with said first thinned pattern and an image recorded in accordance with said second thinned pattern are not overlapped with each other and said first thinned pattern and said second thinned pattern are set such that a number of dots recorded in each of said first step and said third step are substantially equal without regard to the image data.

52. An ink jet recording method according to claim 51, wherein a recording density of said recording means is double that of a recording density of said image data, each pixel of the image data is recorded by a plurality of recording dots, and the same number of the recording dots of each pixel are recorded in the forth run and the back run.

53. An ink jet recording method according to claim 52, wherein said first thinned pattern has a dot arrangement by which dots which are not vertically and horizontally adjacent are recorded, and said second thinned pattern has a dot arrangement by which the remaining dots not recorded by the first thinned pattern are recorded.

54. An ink jet recording method according to claim 52 wherein said recording means includes a plurality of recording heads each having a plurality of ink discharge ports for discharging inks of different colors.

55. An ink jet recording method according to claim 51, wherein said recording means includes a plurality of recording heads each having a plurality of ink discharge ports for discharging inks of different colors.

56. An ink jet recording method according to claim 51, wherein said image data is formed in accordance with an area gradation method of a predetermined dot arrangement, and said first and second thinned patterns are dot arrangement patterns asynchronous with the dot arrangement of the area gradation method.

57. An ink jet recording method according to claim 56, wherein said area gradation method is a dither method.

58. An ink jet recording method according to claim 51, wherein said recording means causes a status change in the ink by thermal energy to discharge the ink from the discharge port.

59. An ink jet recording apparatus for recording a color image corresponding to image data to a recording medium by using recording means for recording, said recording means having a plurality of recording element lines for discharging respective different color ink droplets, comprising:

first move means for reciprocally moving said recording means relative to said recording medium in a main scan direction;

drive means for driving said recording means in accordance with the image data and a first thinned pattern in a forward movement in the main scan direction of said recording means by said first move means and driving said recording means in accordance with the image data and a second thinned pattern in a backward movement in the main scan direction of said recording means by said first move means;

images recorded in accordance with said first and said second thinned patterns not being overlapped with each other; and second move means for moving said recording medium relative to said recording means in a sub-scan direction after each the forward movement of said recording means and the backward movement of said recording means;

said drive means recording an image in accordance with the image data and the first thinned pattern to a predetermined area on said recording medium by using a first recording section of said recording means in the forward movement of said recording means by said first move means, and recording an image in accordance with the image data and the second thinned pattern to said predetermined area on said recording medium by using a second recording section of said recording means in the backward movement of said recording means by said first move means after the sub-scan by said second move means;

said first and second thinned patterns being set such that the numbers of dots recorded in the forward movement of said recording means and the backward movement of said recording means are substantially equal without regard to the image data.

60. An ink jet recording apparatus according to claim 59, wherein a recording density of said recording means is double that of a recording density of said image data, each pixel of the image data is recorded by a plurality of recording dots, and the same number of the recording dots of each pixel are recorded in the forth run and the back run.

61. An ink jet recording apparatus according to claim 60, wherein said first thinned pattern has a dot arrangement by which dots which are not vertically and horizontally adjacent are recorded, and said second thinned pattern has a dot arrangement by which the remaining dots not recorded by the first thinned pattern are recorded.

62. An ink jet recording apparatus according to claim 60 wherein said recording means includes a plurality of recording heads each having a plurality of ink discharge ports for discharging inks of different colors.

63. An ink jet recording apparatus according to claim 59, wherein said recording means includes a plurality of recording heads each having a plurality of ink discharge ports for discharging inks of different colors.

64. An ink jet recording apparatus according to claim 59, wherein said image data is formed in accordance with an area gradation method of a predetermined dot arrangement, and said first and second thinned patterns are dot arrangement patterns asynchronous with the dot arrangement of the area gradation method.

65. An ink jet recording apparatus according to claim 64 wherein said area gradation method is a dither method.

66. An ink jet recording apparatus according to claim 59, wherein said recording means causes a status change in the ink by thermal energy to discharge the ink from the discharge port.

67. An ink jet recording method for performing a relative movement of a recording means for recording, said recording means having a plurality of recording element lines for discharging respective different color ink droplets, relative to a recording medium in a main scan direction, said recording means recording a color image corresponding to an image data on the recording medium during the relative movement, and thereafter performing a relative movement of said recording medium relative to said recording means in a sub-scan direction that is different from said main scan direction, said method comprising:

a first step of providing a set of thinned patterns which are complementary to each other, said thinned patterns corresponding to an area gradation pattern for processing said image data;

a second step of recording on a predetermined area of said recording medium a first thinned image corresponding to said image data which is processed based on the area gradation pattern, using a given one of the set of thinned patterns which was provided in said first step, during a first relative movement of said recording means in the main scan direction; and a third step of recording on the predetermined area of said recording medium a second thinned image corresponding to said image data which is processed based on the area gradation pattern, using another given one of the set of thinned patterns which was provided in said first step, during a second relative movement of said recording means in the main scan direction, said second thinned image not being overlapped with said first thinned image;

wherein an image recorded in accordance with said given thinned pattern and an image recorded in accordance with said another given thinned pattern are not overlapped with each other and said given thinned pattern and said another given thinned pattern are set such that a number of dots recorded in each of said second step and said third step are substantially equal without regard to the image data.

68. A method according to claim 67, wherein in said first step, said set of thinned patterns is selected from a plurality of thinned patterns that renders less of a difference between a first number of dots recorded during the first relative movement and a second number of dots recorded during the second relative movement with regard to every gradation level reproducible by the area gradation pattern.

69. A method according to claim 67, wherein in said second step, the first thinned image is recorded using a first recording section of said recording means, and in said third step, the second thinned image is recorded using a second recording section of the recording means.

70. A method according to claim 69, further comprising a step of moving said recording medium relative to said recording means in the sub-scan direction by a distance that corresponds to the first recording section before starting recording of the second thinned image following recording of the first thinned image.

71. A method according to claim 67, wherein the first relative movement and the second relative movement are in opposite directions.

72. A method according to claim 67, wherein the area gradation pattern is based upon a dither method.

73. A method according to any of claims 67 to 72, wherein said recording means has a plurality of recording heads each of which is equipped with a plurality of recording elements, wherein said recording heads respectively discharge different color inks.

74. A method according to claim 73, wherein said recording element causes a change in a state of the ink by applying thermal energy to said ink, thereby discharging ink droplets from a discharge port.

75. A method according to any of claims 67 to 72, wherein said recording element causes a change in a state of the ink by applying thermal energy to said ink, thereby discharging ink droplets from a discharge port.

76. An ink jet recording apparatus for recording a color image on a recording medium using a recording means for recording, said recording means having a plurality of recording element lines for discharging respective different color ink droplets, comprising:

input means for inputting a signal indicating an area gradation pattern for processing an image data;

providing means for providing a set of thinned patterns which are complementary to each other in response to the signal indicating an area gradation pattern inputted by said input means;

first move means for reciprocatingly moving said recording means relative to said recording medium in a main scan direction; and drive means for driving said recording means in accordance with the image data which is processed based on the area gradation pattern and the set of thinned patterns provided by said providing means, wherein said drive means drives said recording means, using a given one of the set of thinned patterns, during a first relative movement of said recording means by said first move means, and drives said recording means using another given one of the set of thinned patterns, during a second relative movement of said recording means by said first move means, whereby a first thinned image is recorded on a predetermined area of said recording medium during the first relative movement and a second thinned image not overlapped with the first thinned image is recorded on the predetermined area of said recording medium during the second relative movement, and wherein said given thinned pattern and said another given thinned pattern are set such that a number of dots recorded for each of said first thinned image and said second thinned image are substantially equal without regard to the image data.

77. An apparatus according to claim 76, wherein said set of thinned patterns selected from a plurality of thinned patterns by said selection means is such as to render less of a difference between a first number of dots recorded during the first relative movement and a second number of dots recorded during the second relative movement with regard to every gradation level reproducible by the area gradation pattern.

78. An apparatus according to claim 76, wherein said drive means drives the recording means to record the first thinned image on the recording area of said recording medium by using a first recording section of said recording means and to record on the recording area of said recording medium the second thinned image by using a second recording section of said recording means.

79. An apparatus according to claim 78, further comprising second move means for moving said recording medium relative to said recording means in the sub-scan direction which is different from the main direction by a distance that corresponds to the first recording section before starting recording of the second thinned image following recording of the first thinned image.

80. An apparatus according to claim 76, wherein the first relative movement and the second relative movement are in opposite directions.

81. An apparatus according to claim 76, wherein the area gradation pattern is based upon a dither method.

82. An apparatus according to any of claims 76 to 81, wherein said recording means has a plurality of recording heads each of which is equipped with a plurality of recording elements, wherein said recording heads respectively discharge different color inks.

83. An apparatus according to claim 82, wherein said recording element causes a change in a state of the ink by applying thermal energy to said ink, thereby discharging ink droplets from a discharge port.

84. An apparatus according to any of claims 76 to 81, wherein said recording element causes a change in a state of the ink by applying thermal energy to said ink, thereby discharging ink droplets from a discharge port.

85. An ink jet recording method for performing a relative movement of a recording means for recording, said recording means having a plurality of recording element lines for discharging respective different color ink droplets, relative to a recording medium in a main scan direction, said recording means recording a color image corresponding to an image data on the recording medium during the relative movement, and thereafter performing a relative movement of said recording medium relative to said recording means in a sub-scan direction that is different from said main scan direction, said method comprising:

a first step of selecting a set of thinned patterns which are complementary to each other, said thinned patterns corresponding to an area gradation pattern for processing said image data;

a second step of recording on a predetermined area of said recording medium a first thinned image corresponding to said image data which is processed based on the area gradation pattern, using a given one of the set of thinned patterns which was selected in said first step, during a first relative movement of said recording means in the main scan direction; and a third step of recording on the predetermined area of said recording medium a second thinned image corresponding to said image data which is processed based on the area gradation pattern, using another given one of the set of thinned patterns which was selected in said first step, during a second relative movement of said recording means in the main scan direction, said second thinned image not being overlapped with said first thinned image, wherein in said first step, said set of thinned patterns is selected from a plurality of thinned patterns to reduce a difference between a first number of dots recorded during the first relative movement and a second number of dots recorded during the second relative movement with regard to a gradation level reproducible by the area gradation pattern, without regard to the image data.

86. A method according to claim 85, wherein in said second step, the first thinned image is recorded using a first recording section of the recording means, and in said third step, the second thinned image is recorded using a second recording section of the recording means.

87. A method according to claim 86, further comprising a step of moving said recording medium relative to said recording means in the sub-scan direction by a distance that corresponds to the first recording section before starting recording of the second thinned image following recording of the first thinned image.

88. A method according to claim 85, wherein the first relative movement and the second relative movement are in opposite directions.

89. A method according to claim 85, wherein the area gradation pattern is based upon a dither method.

90. A method according to any of claims 85–89, wherein said recording means has a plurality of recording heads each of which is equipped with a plurality of recording elements, wherein said recording heads respectively discharge different color inks.

91. A method according to claim 90, wherein said recording element causes a change in a state of the ink by applying thermal energy to said ink, thereby discharging ink droplets from a discharge port.

92. A method according to any of claims 85 to 89, wherein said recording element causes a change in a state of the ink by applying thermal energy to said ink, thereby discharging ink droplets from a discharge port.

93. An ink jet recording apparatus for recording a color image on a recording medium using a recording means for recording, said recording means having a plurality of recording element lines for discharging respective different color ink droplets, comprising:

input means for inputting a signal indicating an area gradation pattern for processing an image data;

selection means for selecting a set of thinned patterns which are complementary to each other in response to the signal indicating an area gradation pattern inputted by said input means;

first move means for reciprocatingly moving said recording means relative to said recording medium in a main scan direction; and drive means for driving said recording means in accordance with the image data which is processed based on the area gradation pattern and the set of thinned patterns selected by said selection means, wherein said drive means drives said recording means, using a given one of the set of thinned patterns, during a first relative movement of said recording means by said first move means, and drives said recording means using another given one of the set of thinned patterns, during a second relative movement of said recording means by said first move means, whereby a first thinned image is recorded on a predetermined area of said recording medium during the first relative movement and a second thinned image not overlapped with the first thinned image is recorded on the predetermined area of said recording medium during the second relative movement and, wherein said set of thinned patterns selected from a plurality of thinned patterns by said selection means is such as to reduce a difference between a first number of dots recorded during the first relative movement and a second number of number of dots recorded during the second relative movement with regard to a gradation level reproducible by the area gradation pattern, without regard to the image data.

94. An apparatus according to claim 93, wherein said drive means drives said recording means to record the first thinned image on the recording area of said recording medium by using a first recording section of said recording means and to record on the recording area of said recording medium the second thinned image by using a second recording section of said recording means.

95. An apparatus according to claim 94, further comprising second move means for moving said recording medium relative to said recording means in the sub-scan direction which is different from the main direction by a distance that corresponds to the first recording section before starting recording of the second thinned image following recording of the first thinned image.

96. An apparatus according to claim 93, wherein the first relative movement and the second relative movement are in opposite directions.

97. An apparatus according to claim 93, wherein the area gradation pattern is based upon a dither method.

98. An apparatus according to any of claims 93 to 97, wherein said recording means has a plurality of recording heads each of which is equipped with a plurality of recording elements, wherein said recording heads respectively discharge different color inks.

99. An apparatus according to claim 98, wherein said recording element causes a change in a state of the ink by applying thermal energy to said ink, thereby discharging ink droplets from a discharge port.

100. An apparatus according to any of claims 93–97, wherein said recording element causes a change in a state of the ink by applying thermal energy to said ink, thereby discharging ink droplets from a discharge port.

101. An ink jet recording method for performing a relative movement of a recording means for recording, said recording means having a plurality of recording element lines for discharging respective different color ink droplets, relative to a recording medium in a main scan direction, said recording means recording a color image corresponding to an image data on the recording medium during the relative movement, and thereafter performing a relative movement of said recording medium relative to said recording means in a sub-scan direction that is different from said main scan direction, said method comprising:

a first step of providing a set of thinned patterns, including at least a first, a second, a third and a fourth thinned pattern, which are complementary to each other, said thinned patterns corresponding to an area gradation pattern for processing said image data;

a second step of recording on a predetermined area of said recording medium a first thinned image corresponding to said image data which is processed based on the area gradation pattern, using the first thinned pattern which was provided in said first step, during a first relative movement of said recording means in the main scan direction;

a third step of recording on the predetermined area of said recording medium a second thinned image corresponding to said image data which is processed based on the area gradation pattern, using the second thinned pattern which was provided in said first step, during a second relative movement of said recording means in the main scan direction;

a fourth step of recording on a predetermined area of said recording medium a third thinned image corresponding to said image data which is processed based on the area gradation pattern, using the third thinned pattern which was provided in said first step, during a third relative movement of said recording means in the main scan direction; and a fifth step of recording on the predetermined area of said recording medium a fourth thinned image corresponding to said image data which is processed based on the area gradation pattern, using the fourth thinned pattern which was provided in said first step, during a fourth relative movement of said recording means in the main scan direction, said first, said second, said third and said fourth thinned images being complementary to each other, wherein in said first step, said set of thinned patterns is provided from a plurality of thinned patterns to reduce a difference between a number of dots recorded in said second to said fifth steps with regard to a gradation level reproducible by the area gradation pattern, without regard to the image data.

102. An ink jet recording method according to claim 101, wherein in said second step, the first thinned image is recorded using a first recording section of the recording means, and in said third step, the second thinned image is recorded using a second recording section of the recording means.

103. An ink jet recording method according to claim 102, further comprising a step of moving said recording medium relative to said recording means in the sub-scan direction by a distance that corresponds to the first recording section before starting recording of the second thinned image following recording of the first thinned image.

104. An ink jet recording method according to claim 101, wherein the first relative movement and the second relative movement are in opposite directions.

105. An ink jet recording method according to claim 101, wherein the area gradation pattern is based upon a dither method.

106. An ink jet recording method according to any of claims 101–105, wherein said recording means has a plurality of recording heads each of which is equipped with a plurality of recording elements, wherein said recording heads respectively discharge different color inks.

107. An ink jet recording method according to claim 106, wherein said recording element causes a change in a state of the ink by applying thermal energy to said ink, thereby discharging ink droplets from a discharge port.

108. An ink jet recording method according to any of claims 101 to 105, wherein said recording element causes a change in a state of the ink by applying thermal energy to said ink, thereby discharging ink droplets from a discharge port.

* * * * *

UNITED STATES PATENT AND TRADEMARK OFFICE
CERTIFICATE OF CORRECTION

PATENT NO. : 5,625,391

DATED : April 29, 1997

INVENTOR(S) : HIROMITSU HIRABAYASHI ET AL

It is certified that error appears in the above-identified patent and that said Letters Patent is hereby corrected as shown below:

IN THE DRAWINGS

Figure 25C:
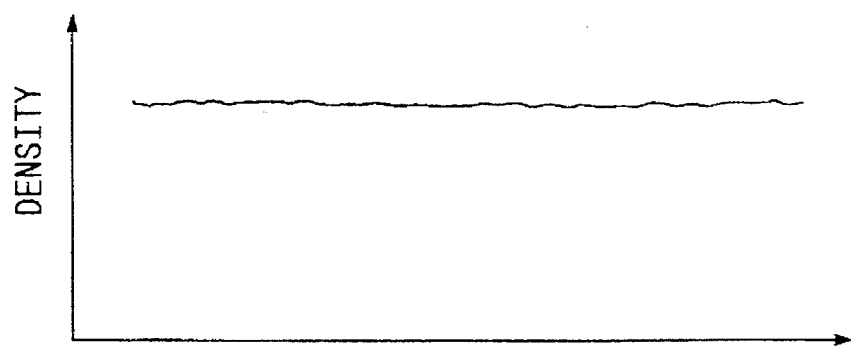
FIGS. 25A to 25C show an ideal print condition of the ink jet printer.
Figure 25B:
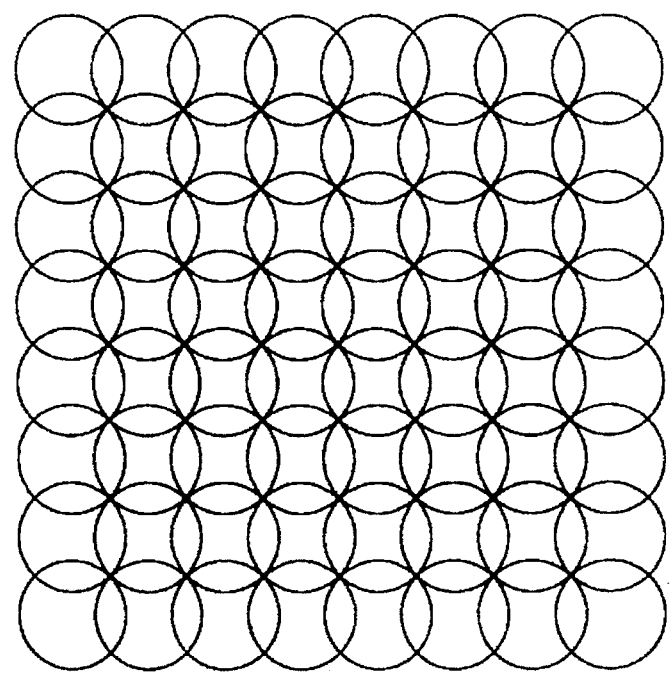
Figure 25A:
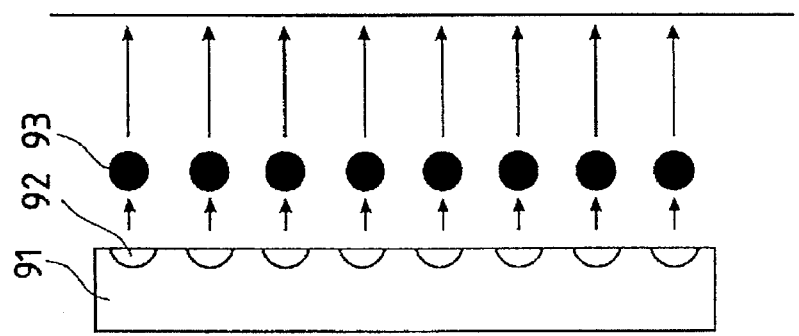

Delete Figures on drawing sheets 22-29, and subsitute therefor Figures 25A, 25B, 25C; 26A, 26B, 26C; 27A, 27B, 27C; 28A, 28B, 28C; 29; 30; 31 and 32, as shown on the attaced pages.

DENSITY

Figure 26C:
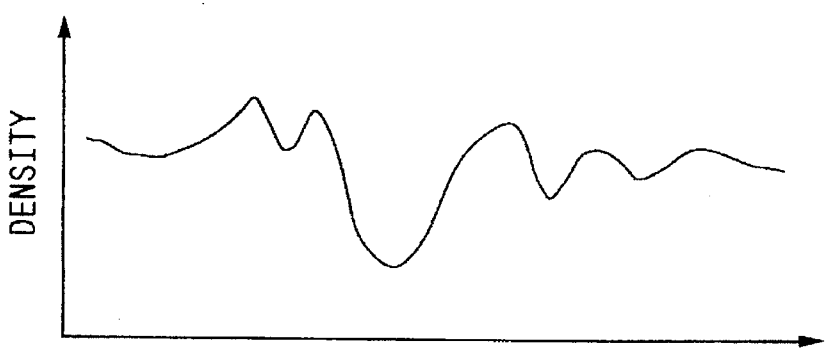
FIGS. 26A to 26C show a print condition of the ink jet printer with ununiformity of density.
Figure 26B:
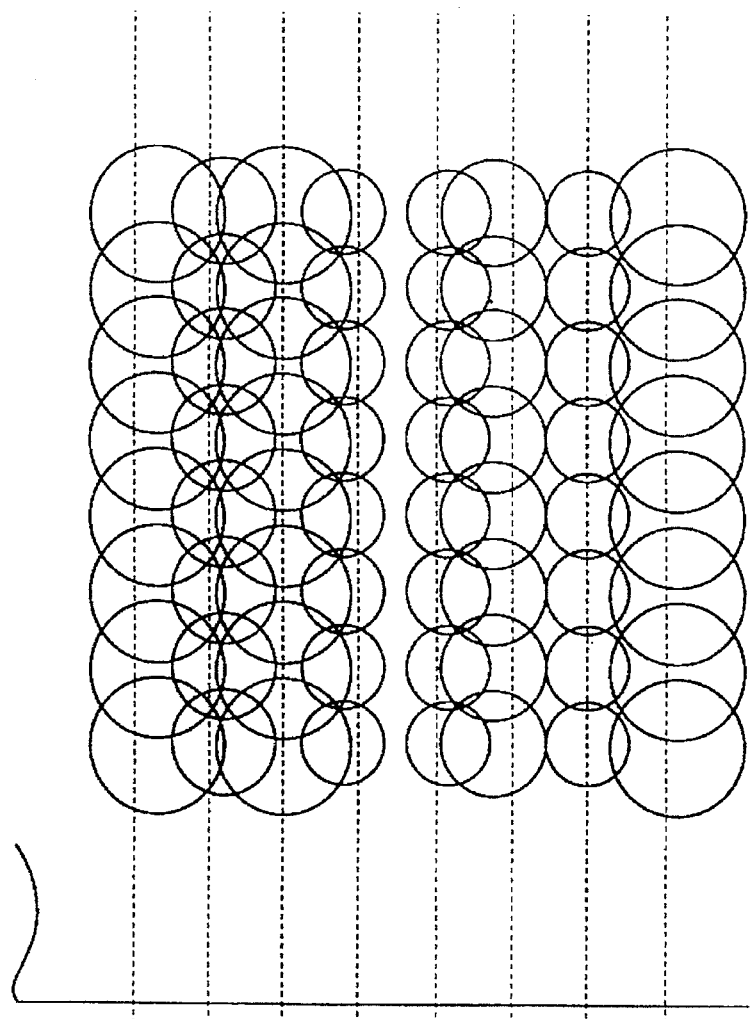
Figure 26A:
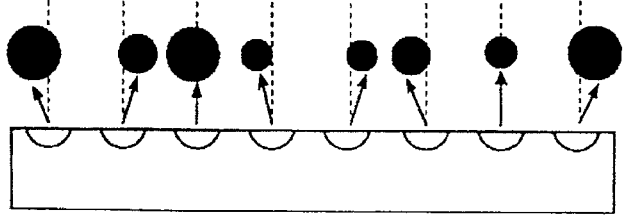
Figure 28A:
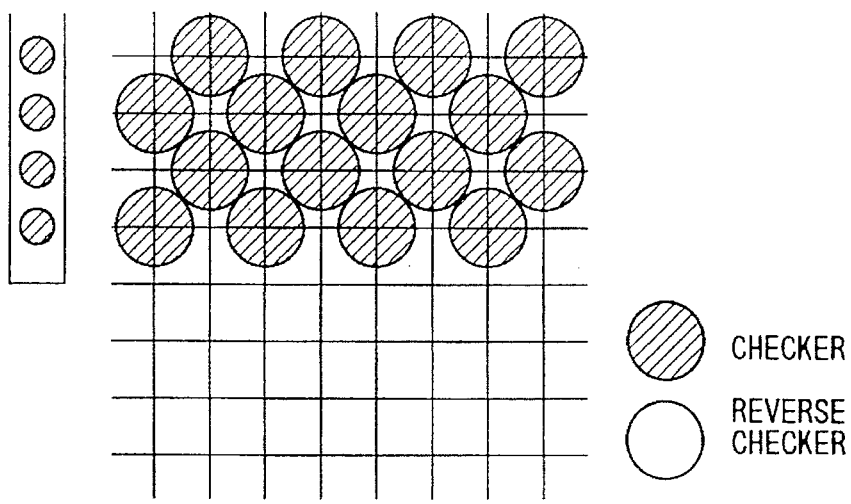
FIGS. 28A to 28C illustrate the reduction of the ununiformity of density by the L/n sheet feed printing method.
Figure 28B:
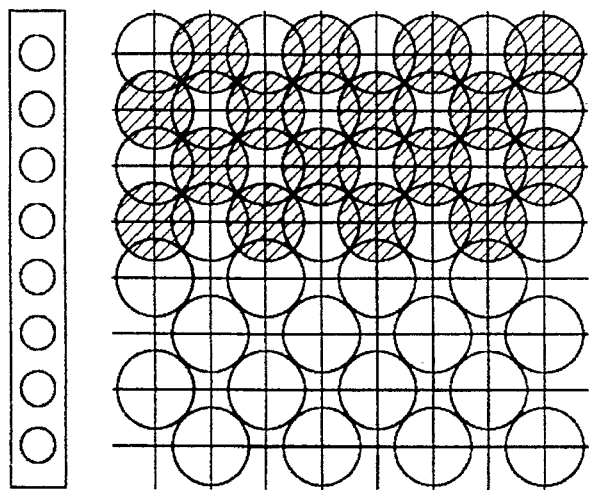
Figure 28C:
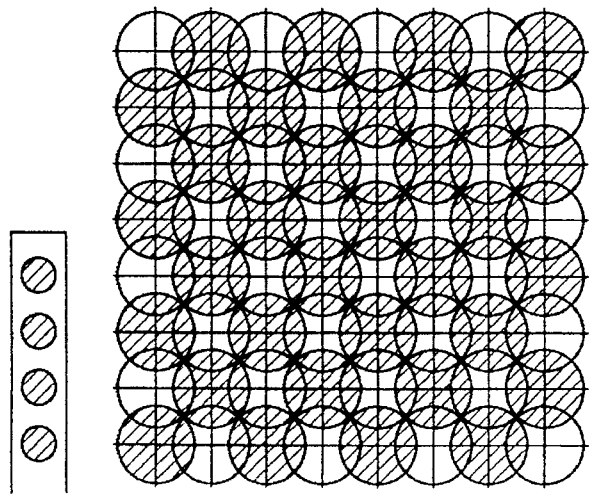
Figure 30:
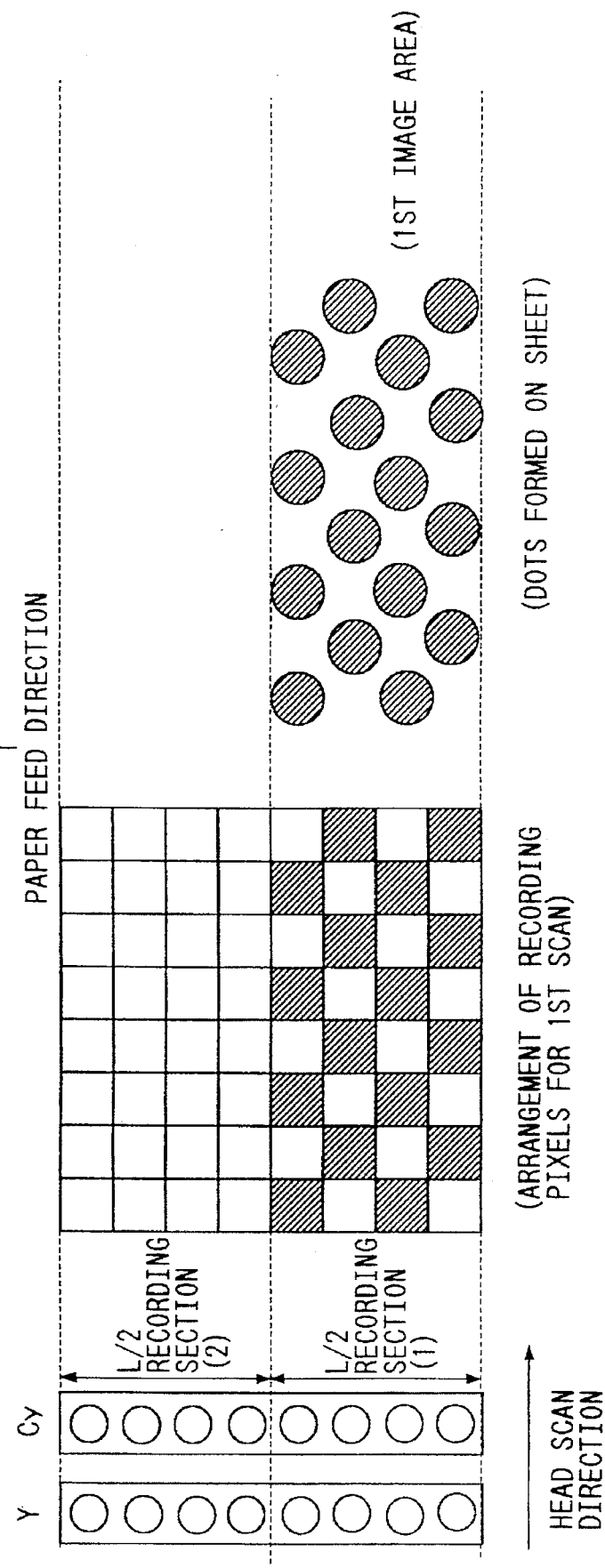
FIG. 30 shows discharge positions in the first scan in the prior art L/n sheet feed method and dot formation thereby.
Figure 31:
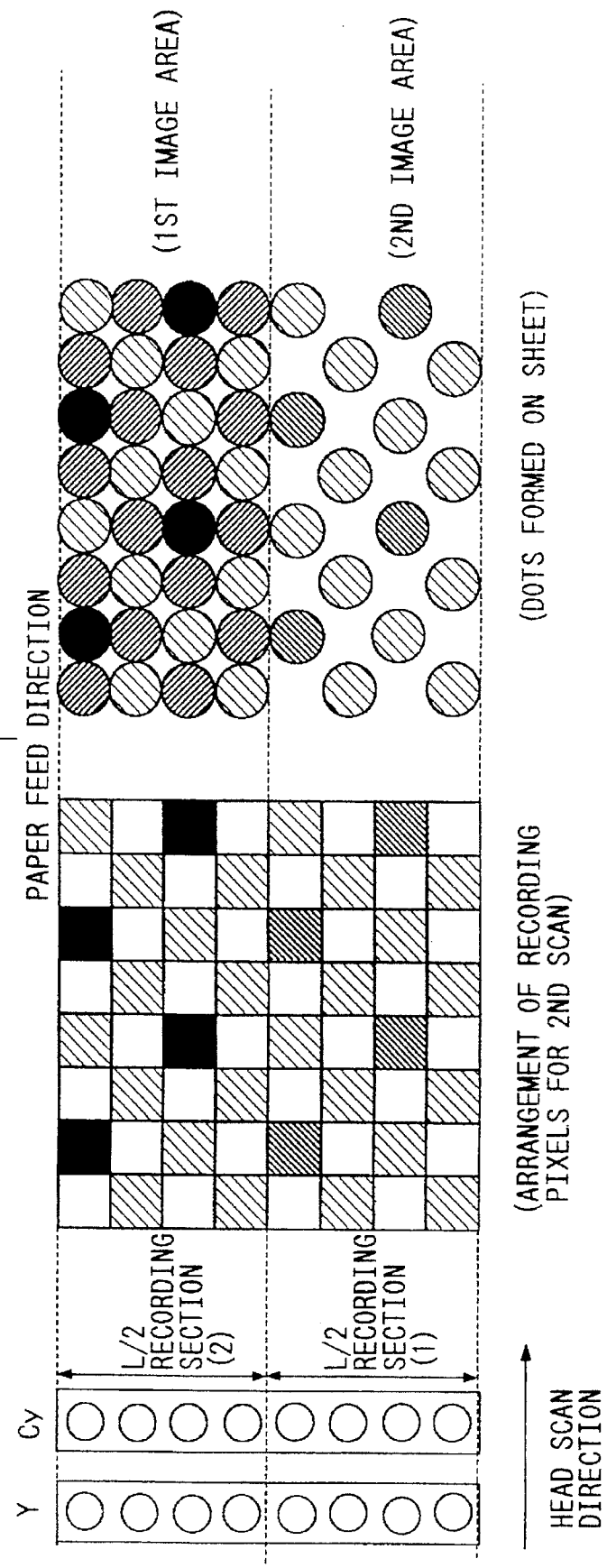
FIG. 31 shows discharge positions in the second scan in the prior art L/n sheet feed method and dot formation thereby.
Figure 32:
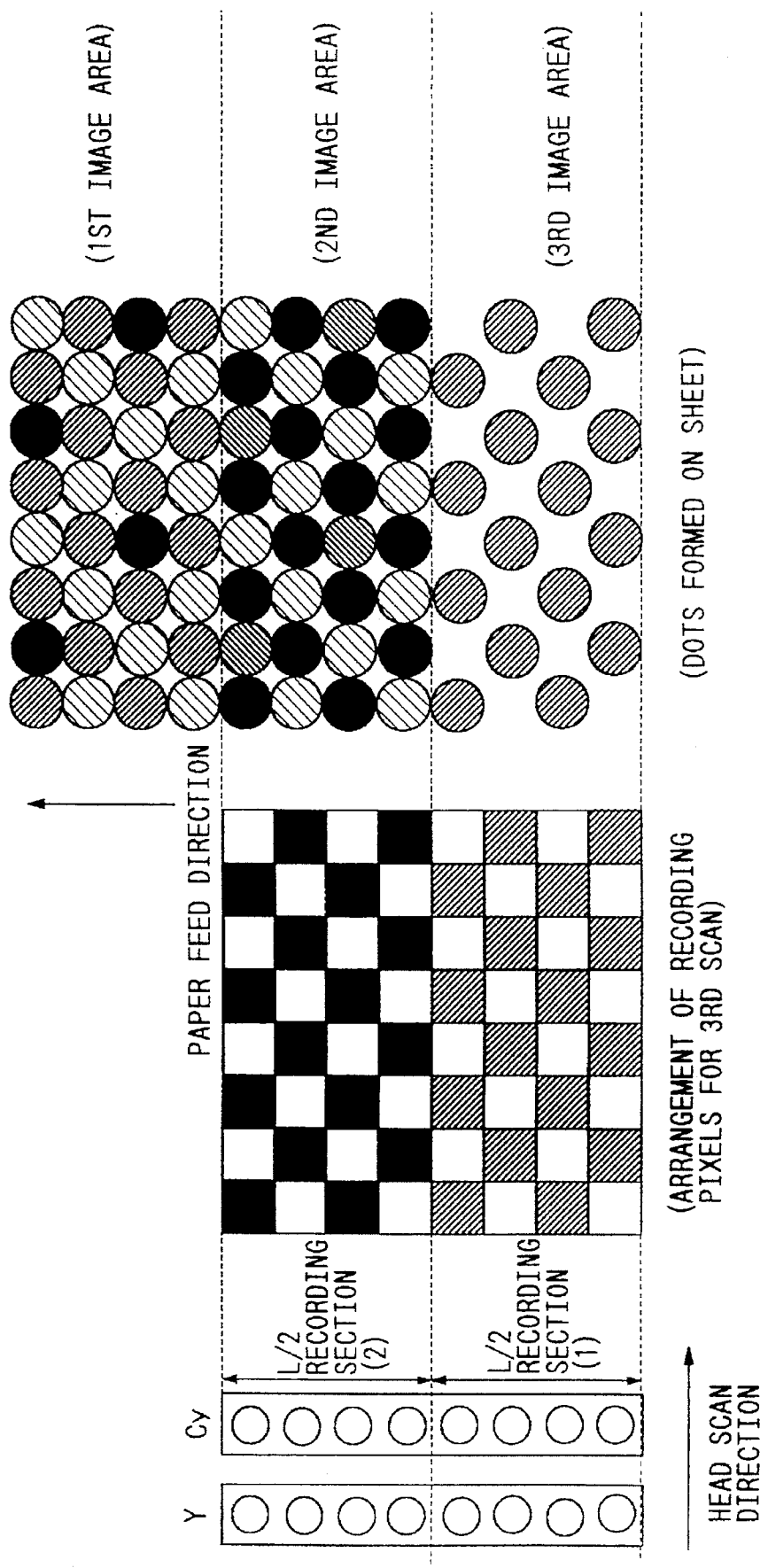
FIG. 32 shows discharge positions in the third scan in the prior art L/n sheet feed method and dot formation thereby.
Figure 33:
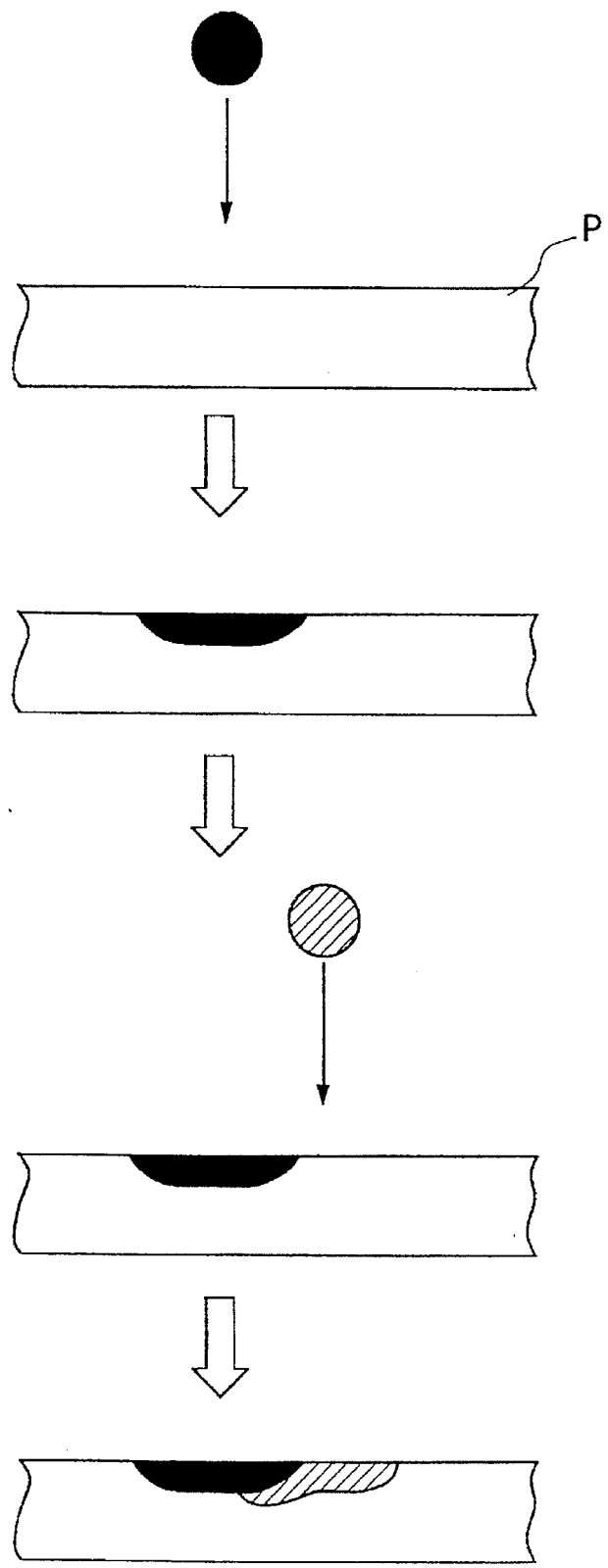
FIG. 33 shows a sectional view of a recording medium for illustrating dot overlap.
Figure 25A:
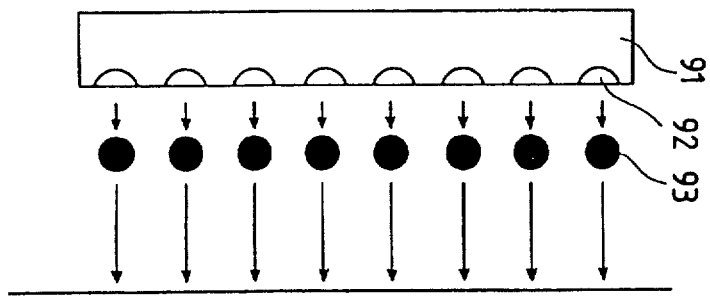
Figure 25B:
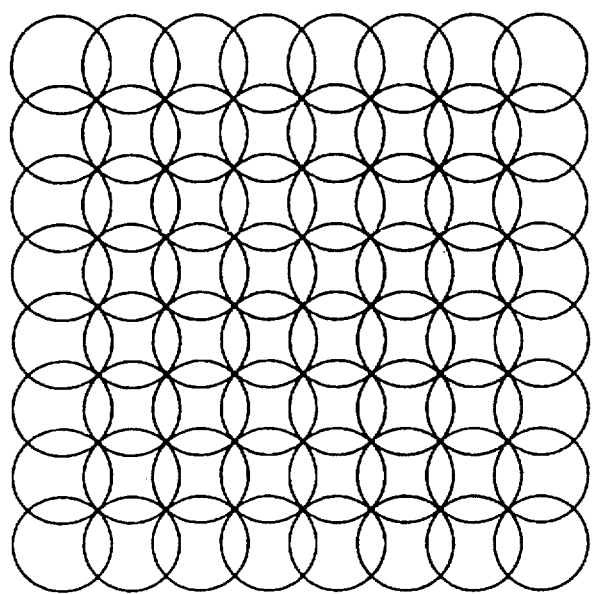
Figure 25C:
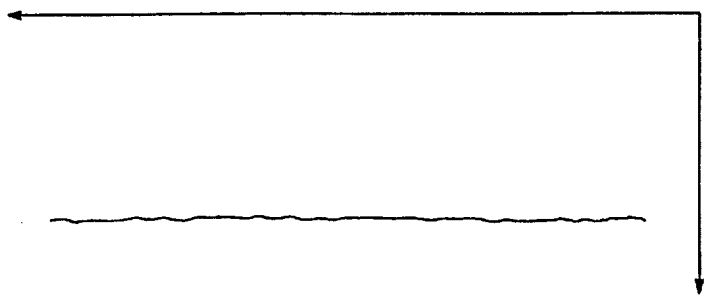
Figures 27A, 27B, 27C:
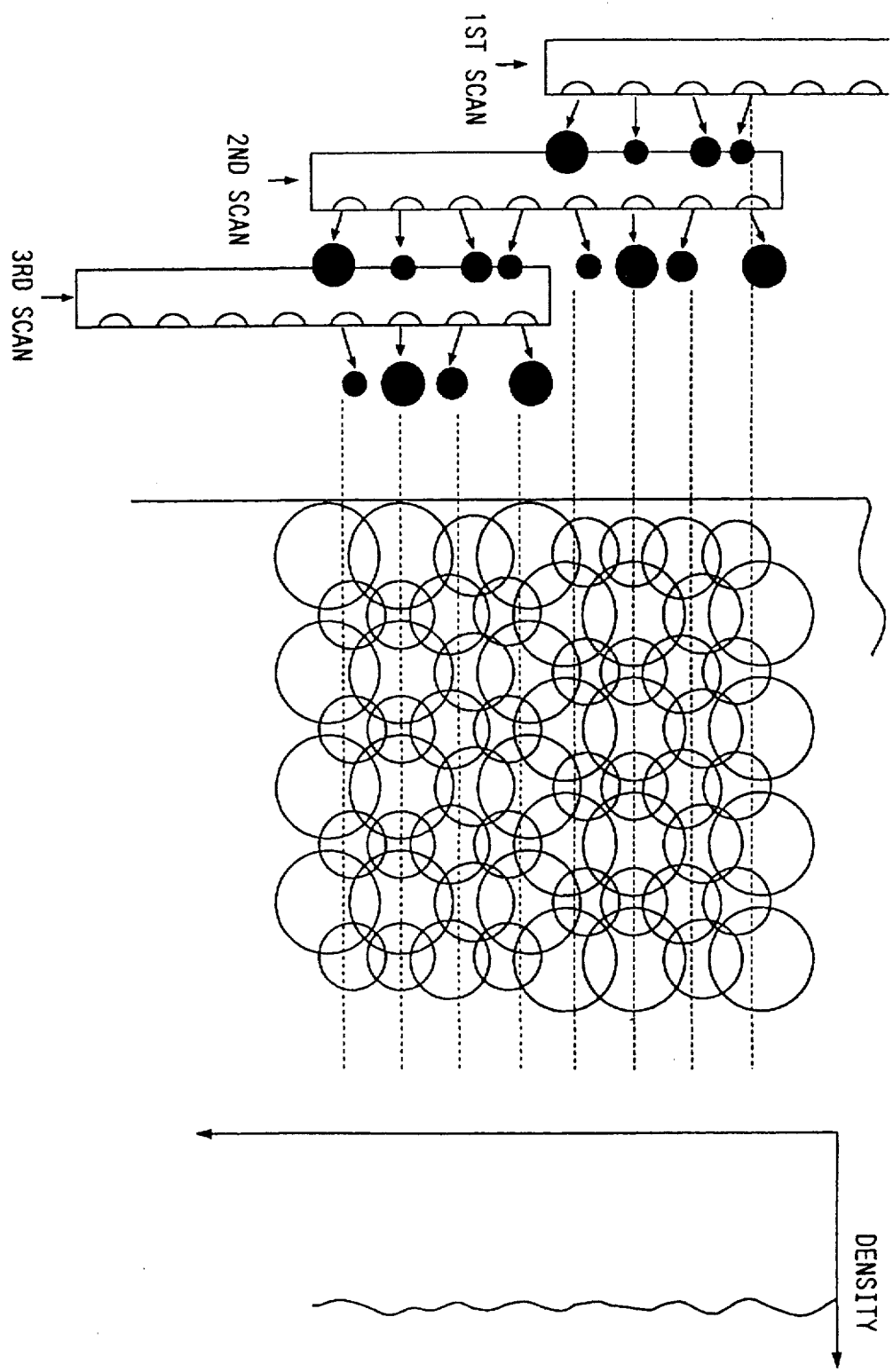
FIGS. 27A to 27C illustrate the reduction of the ununiformity of density by an L/n sheet feed printing method.
Figure 28A:
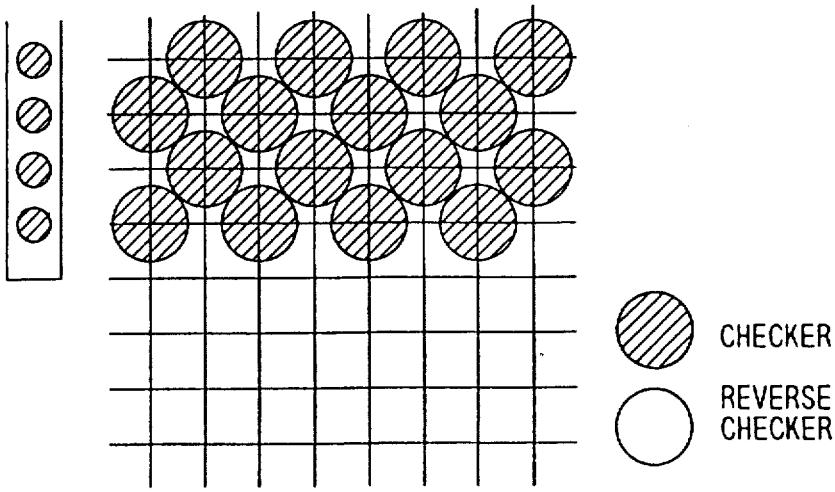
Figure 28B:
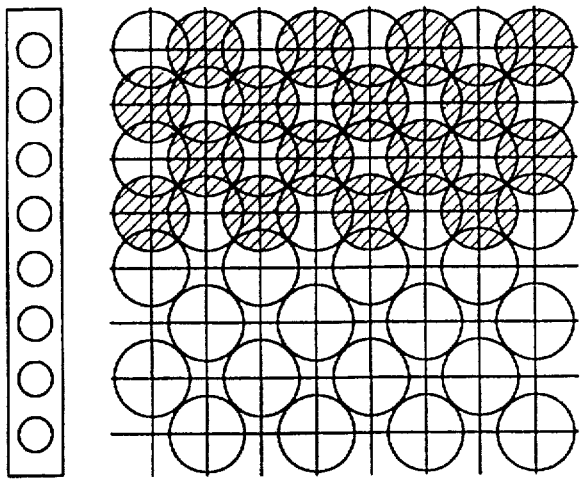
Figure 28C:
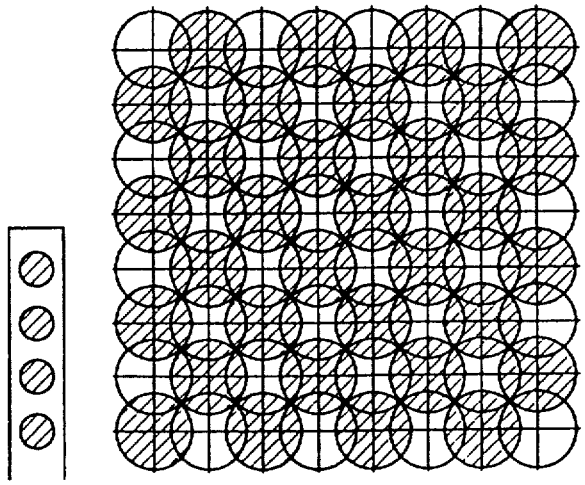
Figure 29:
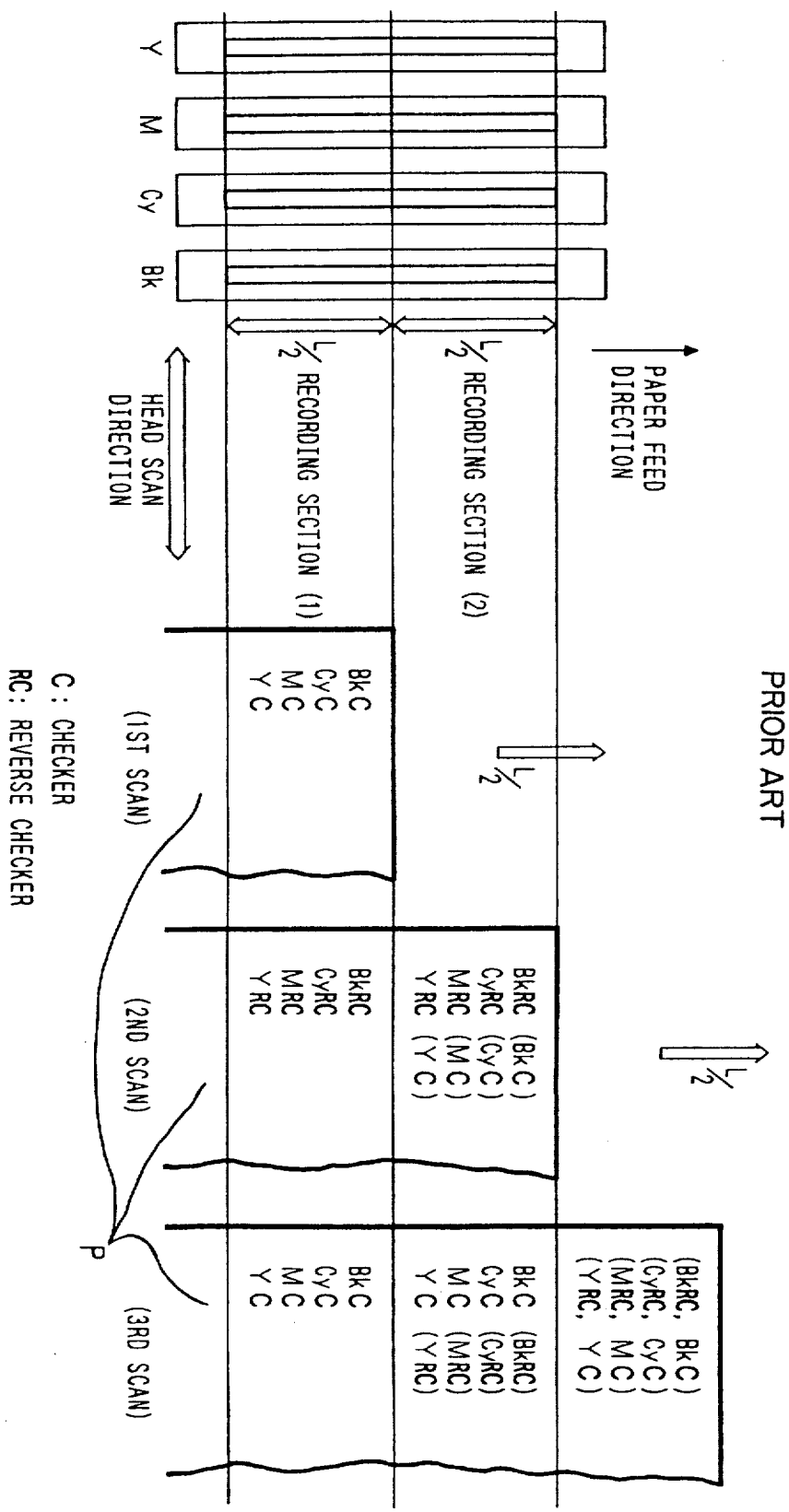
FIG. 29 shows a prior art L/n sheet feed recording method.
Figure 30:
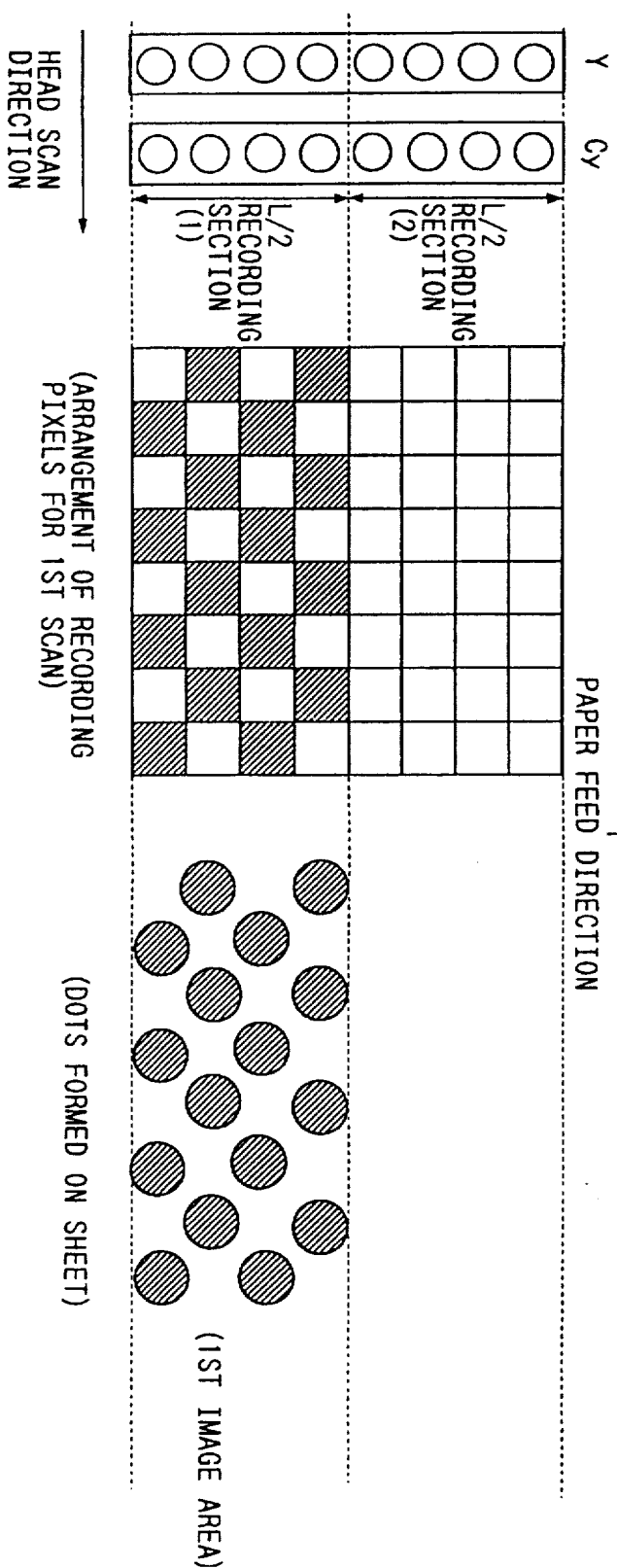
Figure 31:
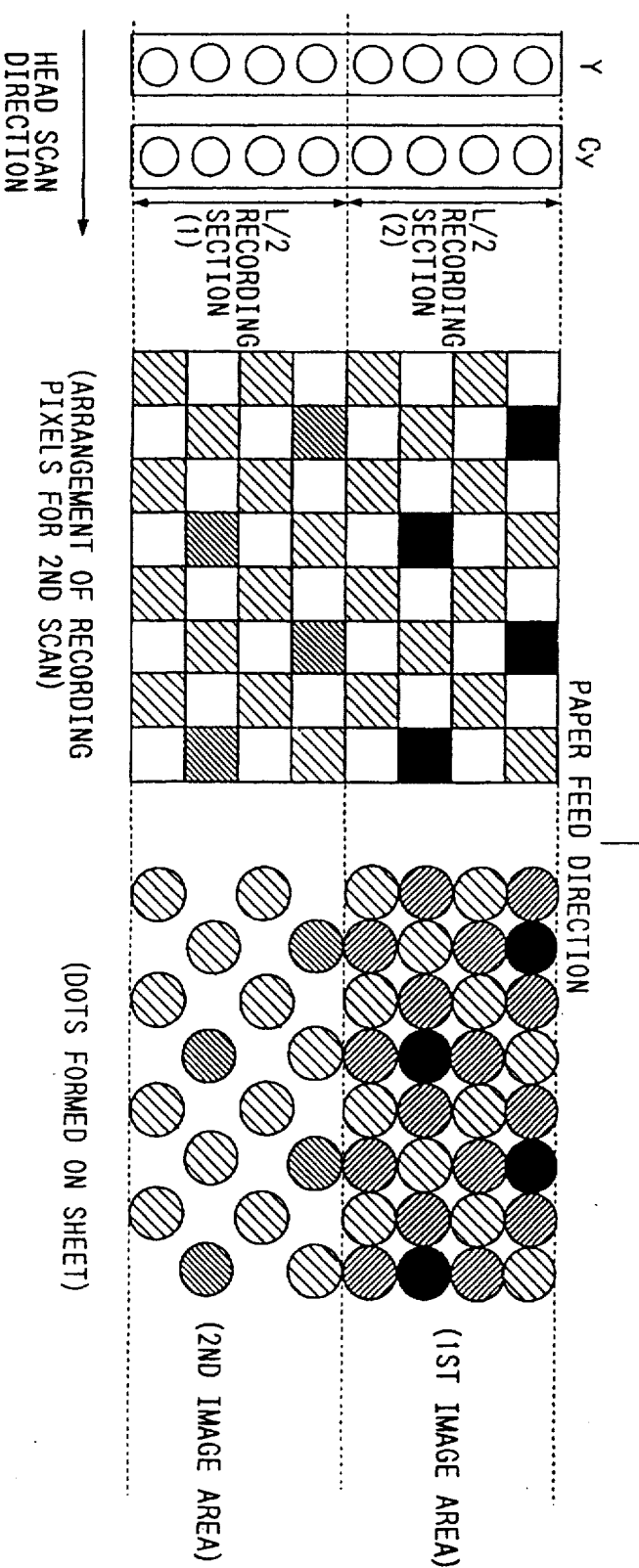
Figure 32:
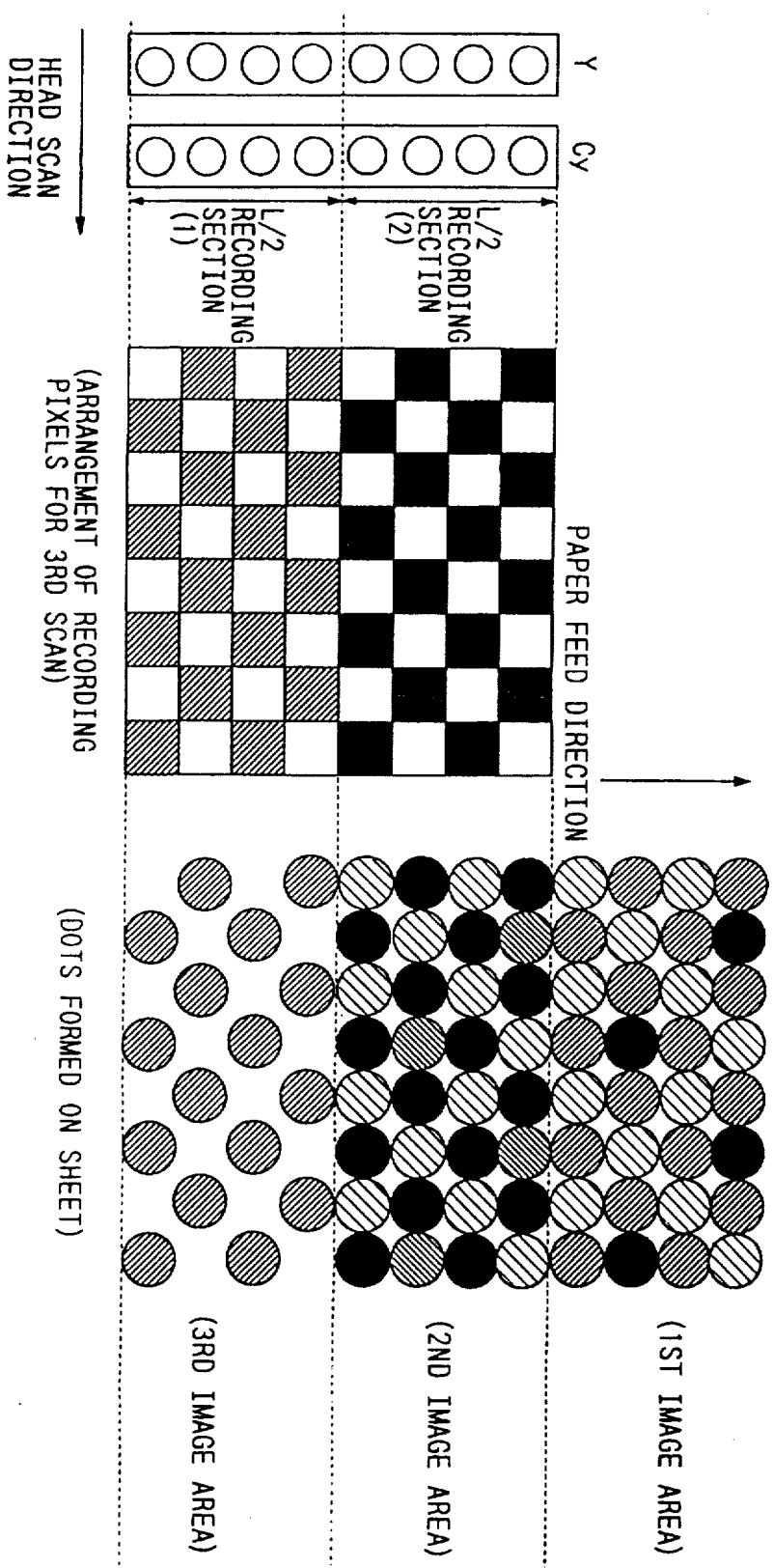

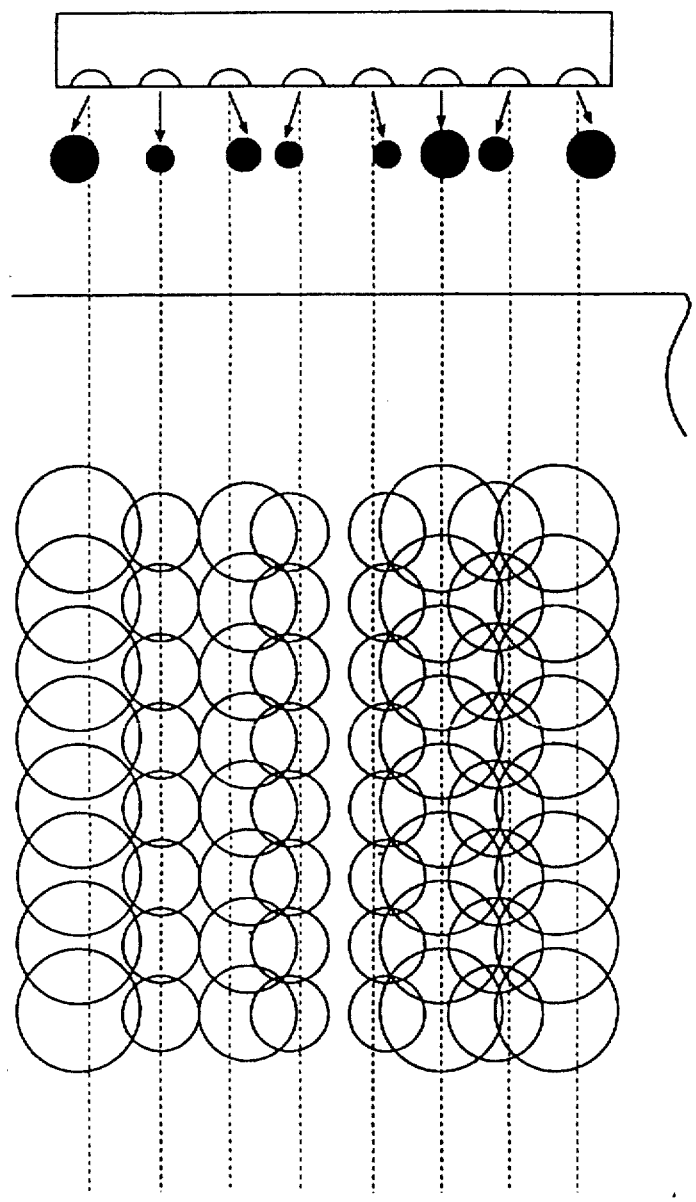
FIG. 26A PRIOR ART
FIG. 26B PRIOR ART
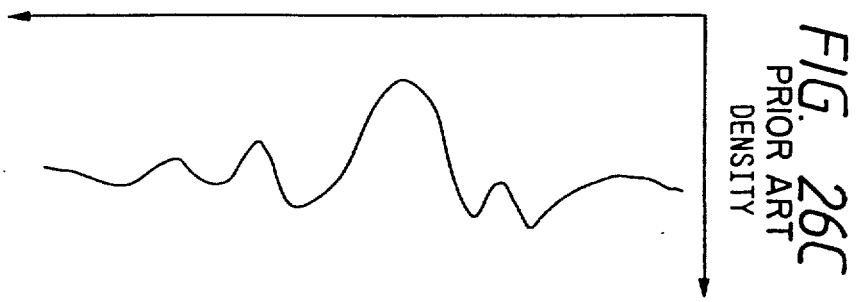
FIG. 26C PRIOR ART
DENSITY

⊘ CHECKER

○ REVERSE CHECKER

UNITED STATES PATENT AND TRADEMARK OFFICE
CERTIFICATE OF CORRECTION

PATENT NO. : 5,625,391
DATED : April 29, 1997
INVENTOR(S) : HIROMITSU HIRABAYASHI ET AL It is certified that error appears in the above-identified patent and that said Letters Patent is hereby corrected as shown below:

COLUMN 1

Line 23, "method," should read --methods,--.
Line 37, Close up right margin.
Line 38, Close up left margin.
Line 40, "to" should be deleted.
Line 58, Close up right margin.
Line 60, Close up left margin.

COLUMN 2

Line 31, "scan-in" should read --scan in--.
Line 56, "variation" should read --variations--.
Line 59, "in" should read --over--.

COLUMN 3

Line 1, "checked" should read --checker--.
Line 18, "parenthes" should read --parentheses--.
Line 23, "half tone" should read --half-tone--.
Line 49, "same" should read --the same--.

UNITED STATES PATENT AND TRADEMARK OFFICE
CERTIFICATE OF CORRECTION

PATENT NO. : 5,625,391

DATED : April 29, 1997

INVENTOR(S) : HIROMITSU HIRABAYASHI ET AL

It is certified that error appears in the above-identified patent and that said Letters Patent is hereby corrected as shown below:

COLUMN 4

Line 23, "deposited" should read --are deposited--.
Line 61, "double" should read --twice the--.
Line 63, "the reduction" should read --a reduction--.
Line 67, "forth" should read --forward--.

COLUMN 5

Line 2, "recording" (second occurrence) should read
    --recording technique--.
Line 6, "ejection" should read --ejection of--.
Line 7, "forth" should read --forward--.
Line 8, "is few case" should read --are few cases--.
Line 17, "forth" should read forward--.
Line 39, "ink" should read --an ink--.
Line 45, "ink" should read --an ink--.
Line 50, "ink" should read --an ink--.
Line 55, "ink" should read --an ink--.
Line 56, "recorded" should read --records--.

COLUMN 6

Line 2, "formation," should read --formation--.

UNITED STATES PATENT AND TRADEMARK OFFICE
CERTIFICATE OF CORRECTION

PATENT NO. : 5,625,391

DATED : April 29, 1997

INVENTOR(S) : HIROMITSU HIRABAYASHI ET AL

It is certified that error appears in the above-identified patent and that said Letters Patent is hereby corrected as shown below:

COLUMN 7

Line 20, "is" should read --are--.
Line 36, "carriages 706" should read --carriage 706--.

COLUMN 8

Line 40, "(forth" should read --(forward--.
Line 51, "parenthes" should read --parentheses--.

COLUMN 9

Line 20, "To-simplify" should read --To simplify--.
Line 24, "over-printed" should read --overprinted--.
Line 56, "light" should read --eight--.

COLUMN 10

Line 52, "otherwise-easily" should read --otherwise easily--.

COLUMN 11

Line 16, "forth and back" should read --forward and backward--.

UNITED STATES PATENT AND TRADEMARK OFFICE
CERTIFICATE OF CORRECTION

PATENT NO. : 5,625,391
DATED : April 29, 1997
INVENTOR(S) : HIROMITSU HIRABAYASHI ET AL It is certified that error appears in the above-identified patent and that said Letters Patent is hereby corrected as shown below:

COLUMN 12

Line 54, "unit 303" should read --unit 302--.

COLUMN 13

Line 4, "same" should read --the same--.
Line 37, "thee" should read --the--.

COLUMN 14

Line 26, "USP's," should read --U.S. Patents,--.
Line 38, "full line" should read --full-line--.
Line 67, "temperature control" should read --temperature-control--.

COLUMN 15

Line 31, "recording" should read --recording means--.
Line 37, "main" should read --the main--.

COLUMN 16

Line 11, "Of" should read --of--.
Line 56, "much" should read --such--.

UNITED STATES PATENT AND TRADEMARK OFFICE
CERTIFICATE OF CORRECTION

PATENT NO. : 5,625,391
DATED : April 29, 1997
INVENTOR(S) : HIROMITSU HIRABAYASHI ET AL It is certified that error appears in the above-identified patent and that said Letters Patent is hereby corrected as shown below:

COLUMN 19

Line 18, "main" should read --main scan--.
Line 23, "in" should read --are in--.
Line 38, "the" should read --the ink--.
Line 40, "relative" should read --a relative--.

COLUMN 21

Line 6, "movement and," should read --movement, and--.
Line 10, "number of" (second occurrence) should be deleted.
Line 24, "main" should read --main scan--.
Line 29, "in" should read --are in--.
Line 38, "claim 38," should read --claim 48,--.
Line 44, "the" should read --the ink--.

COLUMN 22

Line 16, "forth run" should read --forward movement--, and "back run" should read --backward movement--.
Line 65, "each" should read --each of--.

COLUMN 23

Line 22, "forth run" should read --forward movement--, and "back run" should read --backward movement--.
Line 43, "claim 64" should read --claim 64,--.

UNITED STATES PATENT AND TRADEMARK OFFICE
CERTIFICATE OF CORRECTION

PATENT NO. : 5,625,391
DATED : April 29, 1997
INVENTOR(S) : HIROMITSU HIRABAYASHI ET AL It is certified that error appears in the above-identified patent and that said Letters Patent is hereby corrected as shown below:

COLUMN 25

Line 44, "main" should read --main scan--.

COLUMN 27

Line 28, "movement and," should read --movement, and--.
Line 48, "main" should read --main scan--.

Signed and Sealed this

Eighth Day of September, 1998

Attest:

BRUCE LEHMAN

Attesting Officer    Commissioner of Patents and Trademarks